(12) United States Patent
Chen et al.

(10) Patent No.: US 9,752,212 B2
(45) Date of Patent: Sep. 5, 2017

(54) METHOD FOR EXTRACTING AND SEPARATING RARE-EARTH ELEMENT

(71) Applicant: CHANGCHUN INSTITUTE OF APPLIED CHEMISTRY, CHINESE ACADEMY OF SCIENCES, Jilin (CN)

(72) Inventors: Ji Chen, Jilin (CN); Lin Guo, Jilin (CN); Lu Shen, Jilin (CN); Yuefeng Deng, Jilin (CN); Jingbo Lan, Jilin (CN)

(73) Assignee: Changchun Institute of Applied Chemistry, Chinese Academy of Science, Jilin (CN)

( * ) Notice: Subject to any disclaimer, the term of this patent is extended or adjusted under 35 U.S.C. 154(b) by 417 days.

(21) Appl. No.: 14/389,300

(22) PCT Filed: Sep. 29, 2012

(86) PCT No.: PCT/CN2012/082448
§ 371 (c)(1),
(2) Date: Sep. 29, 2014

(87) PCT Pub. No.: WO2013/143271
PCT Pub. Date: Oct. 3, 2013

(65) Prior Publication Data
US 2015/0059528 A1 Mar. 5, 2015

(30) Foreign Application Priority Data
Mar. 31, 2012 (CN) .......................... 2012 1 0093082

(51) Int. Cl.
*C22B 59/00* (2006.01)
*C22B 3/26* (2006.01)
*C22B 3/38* (2006.01)
*C22B 3/04* (2006.01)
*C22B 3/14* (2006.01)

(52) U.S. Cl.
CPC ............. *C22B 59/00* (2013.01); *C22B 3/0005* (2013.01); *C22B 3/0079* (2013.01); *C22B 3/04* (2013.01); *C22B 3/14* (2013.01); *Y02P 10/234* (2015.11)

(58) Field of Classification Search
CPC ......... C22B 59/00; C22B 3/14; C22B 3/0005; C22B 3/04; C22B 3/0079
USPC ........................................................ 423/21.5
See application file for complete search history.

(56) References Cited

U.S. PATENT DOCUMENTS 3,575,687 A * 4/1971 Drobnick ............ C01F 17/0006
423/21.5
5,015,447 A 5/1991 Fulford et al.
2010/0319491 A1 12/2010 Sugahara et al.

FOREIGN PATENT DOCUMENTS

| CN | 85 1 02210 A | 9/1986 |
|---|---|---|
| CN | 85 1 02244 A | 1/1987 |
| CN | 1192479 A | 9/1998 |
| CN | 1514029 A | 7/2004 |
| CN | 1556038 A | 12/2004 |
| CN | 1670228 A | 9/2005 |
| CN | 100352954 * | 12/2007 |
| CN | 100352954 C | 12/2007 |
| CN | 101230420 A | 7/2008 |
| CN | 102190683 A | 9/2011 |
| CN | 102296182 * | 12/2011 |
| CN | 102382982 A | 3/2012 |
| CN | 102618736 A | 8/2012 |
| GB | 2 248 789 A | 4/1992 |
| JP | 4540738 B1 | 9/2010 |

OTHER PUBLICATIONS

Translation of CN 1514029, Jul. 2004.*
Translation of CN 101230420, Jul. 2008.*
International Search Report, corresponding to PCT/CN2012/082448, dated Jan. 10, 2013, 5 pages.
First Office action issued in Chinese priority Application No. 201210093082.X dated Mar. 14, 2013, with English translation, 6 pages.
Huang, Lihuang. "*Rare Earth Extraction Technology*" with translation; Metallurgical Industry Press, Jun. 2006; First Edition, p. 268 (4 pages).

* cited by examiner

*Primary Examiner* — Steven Bos
(74) *Attorney, Agent, or Firm* — Lewis Roca Rothgerber Christie LLP

(57) ABSTRACT

A method for extracting and separating a rare-earth element by extracting and separating the rare-earth element from an aqueous solution of rare-earth nitrate into n-heptane, with 2-ethylhexyl phosphonic acid mono-2-ethylhexyl ester trialkyl methyl ammonium or di-2-ethylhexyl phosphoric acid trialkyl methyl ammonium as an extractant, and n-heptane as a diluent by contacting the aqueous solution of rare-earth nitrate with the extractant and the diluent to extract and separate the rare earth element into n-heptane from the aqueous solution of rare earth nitrate.

21 Claims, 9 Drawing Sheets

METHOD FOR EXTRACTING AND SEPARATING RARE-EARTH ELEMENT

CROSS-REFERENCE TO RELATED APPLICATION(S)

This application is a National Phase Patent Application and claims priority to and benefit of International Application Number PCT/CN2012/082448, filed on Sep. 29, 2012, which claims priority to Chinese Patent Application Number 201210093082.X, filed on Mar. 31, 2012, the entire disclosures of which are incorporated herein by reference.

TECHNICAL FIELD

The present invention belongs to the field of extraction technology, and specifically relates to a method for extracting and separating a rare-earth element.

BACKGROUND

Rare-earth elements include lanthanides with atomic numbers of 57~71 and yttrium with an atomic number of 39, one or more of which are commonly selected to be used as additives for use in metallurgy, glass, chemical industry, nuclear industry, electronics industry, agriculture and pharmaceuticals as well as various functional materials due to their unique physical and chemical properties. A solvent extraction and separation method is not only a main method for separating and purifying a rare-earth element in industrial production of rare-earths at home and abroad, but also a main method for separating and preparing high-purity rare-earth compounds, which has advantages of high processing capacity, fast reaction rate and good separation effect. In recent years, efficient cleanness and separation of a rare-earth element has been becoming a research direction for rare-earths separation, and in 2011, "Emission Standards of Pollutants from Rare Earths Industry" introduced in China requires greener and more efficient rare-earth separation.

Recently, the separation process of a single rare-earth element is mainly achieved by a group separation of rare-earth elements with P507 (2-ethylhexyl phosphonic acid mono-2-ethylhexyl ester) as an extractant (L I Deqian et al., phosphonate liquid-liquid extracting and separating rare-earth element, 1985, CN85102244). However, P507 has relatively small separation factor for heavy rare-earth elements, and meanwhile, leads to problems of high stripping acidity, incomplete stripping and long extraction equilibrium time. An acidic phosphine extractant, Cyanex272 (di(2,4,4-trimethylpentyl)phosphinic acid), when used for separating rare-earth elements, may improve the separation factor, however, the extractant Cyanex272 system is expensive, has a huge reagent and equipment investment, high quality requirements for feed liquid, and the separation system is easy to emulsify, and also its production process is difficult to control. L I A O Chunsheng et al. (Process for extracting and separating high purity lutetium oxide, 1998 CN1192479A.) used saponified P507 as an extractant with the addition of 0.5~20% amine extractant N263 in the hydrochloric acid medium, to continuously separate and produce high-purity lutetium oxide from concentrates of thulium, ytterbium and lutetium or crude lutetium oxides through a one-step process. This system had overcome defects of P507 e.g. long extraction equilibrium time, difficult stripping and others; however, the composition of the extractant continually changed with the reaction, making it more difficult to control, and the acidity of the feed liquid when extraction with this system is 0.1 mol/L.

Under low acidity conditions, processes of extracting rare-earth ions with acidic organic phosphonic acid such as P507, di-(2-ethylhexyl)phosphoric acid (P204), etc., or organic carboxylic acid such as naphthenic acid, CA-12, etc., utilize a cation exchange mechanism, where a saponification (ammonia soap, sodium soap, magnesium or rare-earth soap and others) process is needed to enhance the extraction of rare-earth ions, and in addition to the introduction of corresponding ammonium or sodium, magnesium and other metal ions which leads to corresponding ammonia nitrogen or salinization pollutions, there is a need to consume a high-concentration acid and base to complete a series processes of extraction, washing and stripping. Moreover, P204 and others tend to generate emulsification at low acidity of the feed liquid, have much difficulty in the stripping of middle-heavy rare-earth element, and have much spent acid in strip liquor and large acid and base consumption (Chinese Patent ZL85102210). Even though under high acidity conditions (>2 mol/L), P507 and P204 may extract rare-earth ions using the P=O bonds in their molecules under non-saponified conditions, there may exist problems of high acid and base consumption and low extraction rate.

In addition, Chinese Patent CN100352954C discloses a process for extracting and separating a rare-earth element with addition of a modifier, which separates a single rare-earth element using a system of P507 added with alcohol, due to the difference among solubility of each component in the mixed system, long-time running will lead to changing of the extractant composition, which will affect the extraction effect of the system. The inventor considers providing a method for extracting and separating a rare-earth element, which uses an extractant which is not necessarily to be saponified and provides increased separation factor for the rare-earth element.

SUMMARY

In view of the above, the technical problem to be solved by the present invention is to provide a method for extracting and separating a rare-earth element, which uses an extractant which is not necessarily to be saponified and provides increased separation factor for the rare-earth element.

In order to solve the technical problem mentioned above, the present invention provides a method for extracting and separating a rare-earth element, comprising:

extracting the rare-earth element from an aqueous solution of rare-earth nitrate into n-heptane, by using 2-ethylhexyl phosphonic acid mono-2-ethylhexyl ester trialkyl methyl ammonium or di-2-ethylhexyl phosphoric acid trialkyl methyl ammonium as an extractant, and n-heptane as a diluent.

Preferably, the extraction temperature is 20~50° C.

Preferably, the method of the present invention further comprises using a $NaNO_3$ solution with a concentration of 0.2~1.5 mol/L as a salting-out agent.

Preferably, the extracting the rare-earth element from the aqueous solution of rare-earth nitrate into n-heptane comprises:

mixing a solution of the quaternary ammonium ionic liquid extractant in n-heptane, the salting-out agent and the aqueous solution of rare-earth nitrate, and extracting the rare-earth element from the aqueous solution of rare-earth nitrate into n-heptane, the quaternary ammonium ionic liquid extractant being 2-ethylhexyl phosphonic acid mono-2- ethylhexyl ester trialkyl methyl ammonium or di-2-ethylhexyl phosphoric acid trialkyl methyl ammonium.

Preferably, the solution of the quaternary ammonium ionic liquid extractant in n-heptane has a concentration of 0.03~0.1 mol/L.

Preferably, the aqueous solution of rare-earth nitrate has a concentration of $7\sim9\times10^{-4}$ mol/L.

Preferably, after extracting the rare-earth element from the aqueous solution of rare-earth nitrate into n-heptane, the aqueous solution of rare-earth nitrate is controlled to have a pH of 1~4.

Preferably, the method further comprises:

stripping the rare-earth element which have been extracted into n-heptane by using a nitric acid solution.

Preferably, the nitric acid solution has a concentration of 0.04~0.50 mol/L.

Preferably, the rare-earth element is one or more of La, Ce, Pr, Nd, Sm, Eu, Gd, Tb, Dy, Ho, Er, Tm, Yb, Lu and Y.

The present invention further provides a method for extracting and separating a rare-earth element, comprising:

extracting the rare-earth element from an aqueous solution of rare-earth chloride into n-heptane, by using 2-ethylhexyl phosphonic acid mono-2-ethylhexyl ester trialkyl methyl ammonium or di-2-ethylhexyl phosphoric acid trialkyl methyl ammonium as an extractant, and n-heptane as a diluent.

Preferably, the extraction temperature is 20~50° C.

Preferably, the method of the present invention further comprises using a NaCl solution with a concentration of 0.2~1.5 mol/L as a salting-out agent.

Preferably, the extracting the rare-earth element from the aqueous solution of rare-earth chloride into n-heptane comprises:

mixing a solution of the quaternary ammonium ionic liquid extractant in n-heptane, the salting-out agent and the aqueous solution of rare-earth chloride, and extracting the rare-earth element from the aqueous solution of rare-earth chloride into n-heptane, the quaternary ammonium ionic liquid extractant being 2-ethylhexyl phosphonic acid mono-2-ethylhexyl ester trialkyl methyl ammonium or di-2-ethylhexyl phosphoric acid trialkyl methyl ammonium.

Preferably, the solution of the quaternary ammonium ionic liquid extractant in n-heptane has a concentration of 0.01~0.08 mol/L.

Preferably, the aqueous solution of rare-earth chloride has a concentration of $7\sim11\times10^{-4}$ mol/L.

Preferably, after extracting the rare-earth element from the aqueous solution of rare-earth chloride into n-heptane, the aqueous solution of rare-earth chloride is controlled to have a pH of 1~5.

Preferably, the method further comprises:

stripping the rare-earth element which have been extracted into n-heptane by using a hydrochloric acid solution.

Preferably, the hydrochloric acid solution has a concentration of 0.03~0.20 mol/L.

Preferably, the rare-earth element is one or more of La, Ce, Pr, Nd, Sm, Eu, Gd, Tb, Dy, Ho, Er, Tm, Yb, Lu and Y.

The present invention also provides a method for extracting and separating a rare-earth element, comprising:

extracting the rare-earth element from an aqueous solution of rare-earth sulfate into n-heptane, by using 2-ethylhexyl phosphonic acid mono-2-ethylhexyl ester trialkyl methyl ammonium as an extractant, and n-heptane as a diluent.

Preferably, the extraction temperature is 25~50° C.

Preferably, the method of the present invention further comprises using a $Na_2SO_4$ solution with a concentration of 0.1~1 mol/L as a salting-out agent.

Preferably, the extracting the rare-earth element from the aqueous solution of rare-earth sulfate into n-heptane comprises:

mixing a solution of the quaternary ammonium ionic liquid extractant in n-heptane, the salting-out agent and the aqueous solution of rare-earth sulfate, and extracting the rare-earth element from the aqueous solution of rare-earth sulfate into n-heptane, the quaternary ammonium ionic liquid extractant being 2-ethylhexyl phosphonic acid mono-2-ethylhexyl ester trialkyl methyl ammonium.

Preferably, the solution of the quaternary ammonium ionic liquid extractant in n-heptane has a concentration of 0.02~0.08 mol/L.

Preferably, the aqueous solution of rare-earth sulfate has a concentration of $7\sim9\times10^{-4}$ mol/L.

Preferably, after extracting the rare-earth element from the aqueous solution of rare-earth sulfate into n-heptane, the aqueous solution of rare-earth sulfate is controlled to have a pH of 1~7.

Preferably, the method further comprises:

stripping the rare-earth element which have been extracted into n-heptane by using a sulfuric acid solution.

Preferably, the sulfuric acid solution has a concentration of 0.01~0.1 mol/L.

Preferably, the rare-earth element is one or more of La, Ce, Pr, Nd, Sm, Eu, Gd, Tb, Dy, Ho, Er, Tm, Yb, Lu and Y.

The present invention further provides a method for extracting and separating a rare-earth element in a nitric acid system, comprising: extracting the rare-earth element from an aqueous solution of rare-earth nitrate into n-heptane, by using 2-ethylhexyl phosphonic acid mono-2-ethylhexyl ester trialkyl methyl ammonium ([A336][P507]) or di-2-ethylhexyl phosphoric acid trialkyl methyl ammonium ([A336][P204]) as an extractant. In comparison with the prior art, cations and anions in a quaternary ammonium ionic liquid extractant, that is, 2-ethylhexyl phosphonic acid mono-2-ethylhexyl ester trialkyl methyl ammonium and di-2-ethylhexyl phosphoric acid trialkyl methyl ammonium, react with rare-earth ions to form neutral complex molecules, also, a collaborative effect and a competitive effect are present between the cations and the anions in the quaternary ammonium ionic liquid extractant in a rare-earth element extraction process, the separation factor for the rare-earth element is thus increased. Therefore, the method for extracting and separating the rare-earth element of the present invention provides good interfacial phenomena in the extraction process, does not generate emulsification, obviates the need for extractant saponification, provides increased separation factor for rare-earth elements, and provides a particularly increased extraction and separation effect for heavy rare-earth elements. In addition, the method for extracting and separating the rare-earth element of the present invention is of reduced extraction acidity, is of reduced stripping acidity, and is of reduced acid consumption.

The present invention further provides a method for extracting and separating a rare-earth element in a hydrochloric acid system, comprising: extracting the rare-earth element from an aqueous solution of rare-earth chloride into n-heptane, by using 2-ethylhexyl phosphonic acid mono-2-ethylhexyl ester trialkyl methyl ammonium ([A336][P507])

or di-2-ethylhexyl phosphoric acid trialkyl methyl ammonium ([A336][P204]) as an extractant. In comparison with the prior art, cations and anions in a quaternary ammonium ionic liquid extractant, that is, 2-ethylhexyl phosphonic acid mono-2-ethylhexyl ester trialkyl methyl ammonium and di-2-ethylhexyl phosphoric acid trialkyl methyl ammonium, react with rare-earth ions to form neutral complex molecules, also, a collaborative effect and a competitive effect are present between the cations and the anions in the quaternary ammonium ionic liquid extractant in a rare-earth element extraction process, the separation factor for the rare-earth element is thus increased. Therefore, the method for extracting and separating the rare-earth element of the present invention provides good interfacial phenomena in the extraction process, does not generate emulsification, obviates the need for extractant saponification, provides increased separation factor for rare-earth elements, and provides a particularly increased extraction effect for several light rare-earth elements. In addition, the method for extracting and separating the rare-earth element of the present invention is of reduced extraction acidity, is of reduced stripping acidity, and is of reduced acid consumption.

The present invention further provides a method for extracting and separating a rare-earth element in a sulfuric acid system, comprising: extracting the rare-earth element from an aqueous solution of rare-earth sulfate into n-heptane, by using 2-ethylhexyl phosphonic acid mono-2-ethylhexyl ester trialkyl methyl ammonium ([A336][P507]) as an extractant. In comparison with the prior art, cations and anions in a quaternary ammonium ionic liquid extractant, that is, 2-ethylhexyl phosphonic acid mono-2-ethylhexyl ester trialkyl methyl ammonium, react with rare-earth ions to form neutral complex molecules, also, a collaborative effect and a competitive effect are present between the cations and the anions in the quaternary ammonium ionic liquid extractant in a rare-earth element extraction process, the separation factor for the rare-earth element is thus increased. Therefore, the method for extracting and separating the rare-earth element of the present invention provides good interfacial phenomena in the extraction process, does not generate emulsification, and obviates the need for extractant saponification. And the method for extracting and separating the rare-earth element of the present invention is of reduced extraction acidity, is of reduced stripping acidity, and is of reduced acid consumption.

DETAILED DESCRIPTION

Figure 1:
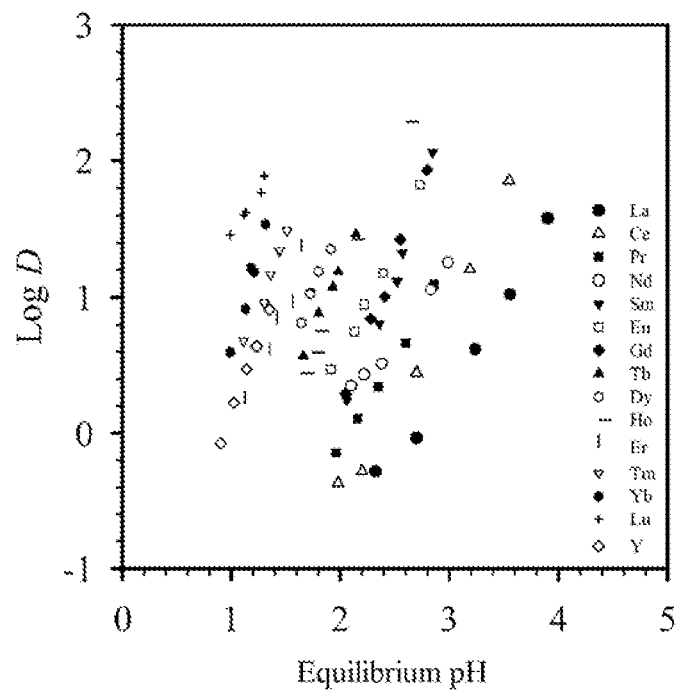
FIG. 1 is a point diagram of equilibrium pH values of a solution versus extraction distribution ratios of rare-earth ions with [A336][P507] as an extractant, provided in Examples 13~27 of the present invention.

For further understanding of the present invention, preferred embodiments of the present invention will be described in combination with examples as follows, however, it should be understood that these descriptions is only for further explaining the features and advantages of the present invention, rather than limiting the claims of the present application.

The present invention provides a method for extracting and separating a rare-earth element, which extracts the rare-earth element in a hydrochloric acid, nitric acid and sulfuric acid system using 2-ethylhexyl phosphonic acid mono-2-ethylhexyl ester trialkyl methyl ammonium or di-2- ethylhexyl phosphoric acid trialkyl methyl ammonium as an extractant. When used in a nitric acid system:

the present invention provides a method for extracting and separating a rare-earth element, comprising: extracting the rare-earth element from an aqueous solution of rare-earth nitrate into n-heptane, by using 2-ethylhexyl phosphonic acid mono-2-ethylhexyl ester trialkyl methyl ammonium ([A336][P507]) or di-2-ethylhexyl phosphoric acid trialkyl methyl ammonium ([A336][P204]) as an extractant, and n-heptane as a diluent.

During the extraction and separation process mentioned above, the present invention uses a quaternary ammonium ionic liquid extractant, that is, 2-ethylhexyl phosphonic acid mono-2-ethylhexyl ester trialkyl methyl ammonium or di-2-ethylhexyl phosphoric acid trialkyl methyl ammonium, as an extractant. Cations and anions in the extractant [A336][P507] and [A336][P204], react with rare-earth ions to form neutral complex molecules, also, a collaborative effect and a competitive effect are present between the cations and the anions in the extractant [A336][P507] or [A336][P204] in a process for extracting different rare-earth elements. Due to the collaborative and competitive effect between the cations and the anions, the separation factor for the rare-earth element is thus increased, and especially the separation factor for heavy rare-earth elements is increased.

There is no particular limitation on the method for preparing the quaternary ammonium ionic liquid extractant, which may be prepared by using methods known by those skilled in the art. As a preferred embodiment, the present invention synthesizes 2-ethylhexyl phosphonic acid mono-2-ethylhexyl ester trialkyl methyl ammonium ([A336][P507]) and di-2-ethylhexyl phosphoric acid trialkyl methyl ammonium ([A336][P204]) respectively, in accordance with the technical solution provided in Chinese Patent Application No. 200910217922.7. Wherein 2-ethylhexyl phosphonic acid mono-2-ethylhexyl ester trialkyl methyl ammonium ([A336][P507]) is preferably prepared by a method as follows: 112.36 g of quaternary ammonium chloride 336 is weighed and is dissolved completely in 500 mL distilled isopropanol; 6.39 g of metallic sodium is added into a plastic bottle, and then 125 mL distilled isopropanol is added and reacted for 3 hours at room temperature to prepare sodium alcoholate; the solutions mentioned above are mixed and stirred for 4 hours at 50° C., to prepare [A336][OR]; the resulting solution is centrifuged for 10 minutes at 8000 rpm to remove the precipitate of sodium chloride; 500 mL deionized water is added to the filtrate and shaken for 30 minutes to prepare [A336][OH] through hydrolysis; and 172 mL [A336][OH] solution with a concentration of 0.121 mol/L is taken, and 6.2455 g of P507 (the molar ratio of [A336][OH] to P507 is 1.1:1) is added thereto, the solution is stirred with reflux for 12 hours at 50° C., and after the resulting solution is left standing for phase separation, the lower phase is discarded, and the upper phase is rotated to remove the contained isopropanol and water at 80° C. and 20 mbar, to obtain [A336][P507].

Furthermore, di-2-ethylhexyl phosphoric acid trialkyl methyl ammonium ([A336][P204]) is prepared as follows: after [A336][OH] is prepared according to the method as described above, taking 192 mL [A336][OH] solution with a concentration of 0.111 mol/L, 8.0057 g of P204 (the molar ratio of [A336][OH] to P204 is 1.1:1) is added thereto, the solution is stirred with reflux for 12 hours at 50° C., and after the resulting solution is left standing for phase separation, the lower phase is discarded, and the upper phase is rotated to remove the contained isopropanol and water at 80° C. and 20 mbar, to obtain [A336][P204].

According to the present invention, the extracting the rare-earth element from the aqueous solution of rare-earth nitrate into n-heptane includes: mixing a solution of the quaternary ammonium ionic liquid extractant in n-heptane, the salting-out agent and the aqueous solution of rare-earth nitrate, and extracting the rare-earth element from the aqueous solution of rare-earth nitrate into n-heptane, the quaternary ammonium ionic liquid extractant being 2-ethylhexyl phosphonic acid mono-2-ethylhexyl ester trialkyl methyl ammonium or di-2-ethylhexyl phosphoric acid trialkyl methyl ammonium. Preferably, the mixing the solution of the quaternary ammonium ionic liquid extractant in n-heptane, the salting-out agent and the aqueous solution of rare-earth nitrate preferably further comprises: shaking at a constant temperature of 25° C., preferably for 1 hour, determining the concentration of the rare-earth element in the aqueous phase, and in turn calculating the extraction rate and distribution ratio of the rare-earth element.

In addition, the present invention preferably further includes using a $NaNO_3$ solution with a concentration of 0.2~1.5 mol/L as a salting-out agent, and the $NaNO_3$ solution preferably has a concentration of 0.5~1.2 mol/L, and more preferably of 0.6~1.0 mol/L. When the concentration is less than 0.2 mol/L, the extraction rate of the rare-earth ions is very low, which is not easy to be detected and calculated; while when the concentration is more than 1.5 mol/L, the rare-earth ions are extracted completely, which is not easy to be detected and calculated. In addition, the extraction temperature will have a certain effect on extraction and separation results of the rare-earth element, where too high or too low extraction temperature is adverse to the extraction and separation of the rare-earth element. The extraction temperature used in the present invention is preferably 20~50° C., more preferably 20~30° C. The solution of the quaternary ammonium ionic liquid extractant in n-heptane mentioned above has a concentration of 0.03~0.1 mol/L, more preferably of 0.03~0.08 mol/L, and more preferably of 0.05 mol/L.

There is no particular limitation on the rare-earth element in the aqueous solution of rare-earth nitrate in the present invention, which may be a single rare-earth element or a plurality of rare-earth elements known to those skilled in the art. As a preferred embodiment, the rare-earth element is one or more of La, Ce, Pr, Nd, Sm, Eu, Gd, Tb, Dy, Ho, Er, Tm, Yb, Lu and Y. In addition, the aqueous solution of rare-earth nitrate preferably has a concentration of $7\sim9\times10^{-4}$ mol/L, more preferably of $7\sim8\times10^{-4}$ mol/L, and more preferably of $7.5\times10^{-4}$ mol/L.

After extracting the rare-earth element from the aqueous solution of rare-earth nitrate into n-heptane according to the above method, the aqueous solution of rare-earth nitrate is preferably controlled to have a pH of 1~4. In addition, the present invention preferably further comprises: stripping the rare-earth elements which have been extracted into the n-heptane using a nitric acid solution. Preferably, the nitric acid solution has a concentration of 0.04~0.50 mol/L, and more preferably of 0.1~0.3 mol/L. When the concentration is less than 0.04 mol/L, the stripping rate of some rare-earth ions is relatively low, which is not easy to be detected and calculated.

After completing the extraction and separation process, the rare-earth element in the raffinate or stripped solution obtained in the present invention is preferably determined by using arsenazo (III) colorimetry. The calculation formulas for extraction rate (E), distribution ratio (D) and separation factor ($\beta$) are as follows:

$$E(\%) = \frac{(C_{aq,o} - C_{aq})}{C_{aq,o}} \times 100$$

$$D = \frac{(C_{aq,o} - C_{aq})V_{aq}}{C_{aq}V_{org}}$$

$$\beta = \frac{D_1}{D_2}$$

wherein $C_{aq,0}$ and $C_{aq}$ are the initial concentration and equilibrium concentration of the rare-earth ions in the aqueous phase respectively, and $V_{aq}$ and $V_{org}$ are the volume of the aqueous phase and the organic phase respectively.

Taken together, the present invention is applied to separation of rare-earths element in a nitric acid system with [A336][P507] or [A336][P204] as an extractant, and n-heptane as a diluent, which has the following advantages of: reduced extraction acidity, reduced stripping acidity and reduced acid consumption; providing good interfacial phenomena without generation of emulsification; obviating need for extractant saponification and obviating need for adding other aids, saving the cost, having high separation factor for rare-earth elements in particular for heave rare-earth elements.

When used in a hydrochloric acid system:

the present invention provides a method for extracting and separating a rare-earth element in a hydrochloric acid system, comprising:

extracting the rare-earth element from an aqueous solution of rare-earth chloride into n-heptane, by using 2-ethylhexyl phosphonic acid mono-2-ethylhexyl ester trialkyl methyl ammonium or di-2-ethylhexyl phosphoric acid trialkyl methyl ammonium as an extractant and n-heptane as a diluent.

There is need for extractant saponification to separate a single rare-earth element in an acidic system with the existing acid extractants, and some mixed acidic systems will lead to a changing of composition during a long-term operation, therefore, the present invention separates a single rare-earth element in a hydrochloric acid system by using 2-ethylhexyl phosphonic acid mono-2-ethylhexyl ester trialkyl methyl ammonium ([A336][P507]) or di-2-ethylhexyl phosphoric acid trialkyl methyl ammonium ([A336][P204]) as an extractant, which may not only avoid saponification, but also avoid the changing of composition during the long-term operation, and the process has low extraction acidity and increased separation factor for the rare-earth elements.

The inventors have found that, the extraction and separation of rare-earth ions with an extractant would be affected by anions ($NO_3^-$, $Cl^-$ or $SO_4^{2-}$) in the system, because these anions would form different extracted complexes with the rare-earth ions and the extractant during the extraction process, moreover, the optimal pH value for combining the rare-earth ions and the extractant would vary according to different anions.

According to the present invention, the [A336][P507] has a structure shown in Formula I; and the [A336][P204] has a structure shown in Formula II.

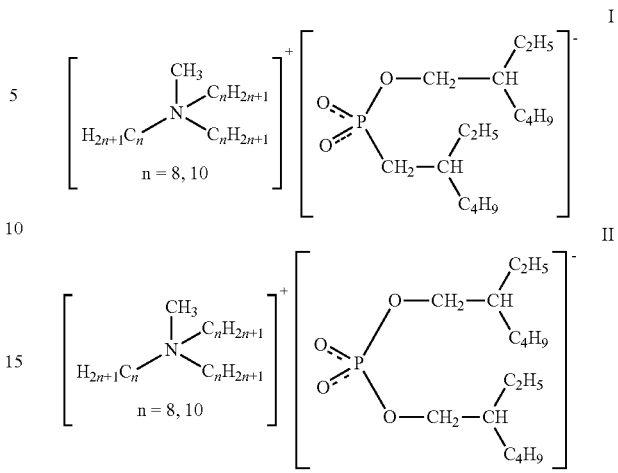

The present invention synthesizes 2-ethylhexyl phosphonic acid mono-2-ethylhexyl ester trialkyl methyl ammonium and di-2-ethylhexyl phosphoric acid trialkyl methyl ammonium respectively, by using the technical solution provided by Chinese Patent Application No. 201210120559.9. Wherein 2-ethylhexyl phosphonic acid mono-2-ethylhexyl ester trialkyl methyl ammonium ([A336][P507]) is preferably prepared by a method as follows:

5.6 g of 0.10 mol potassium hydroxide is dissolved into 56 ml ethanol to obtain an alcoholic solution of the base, 40 g of 0.1 mol quaternary ammonium chloride 336 is weighed and is added dropwise to the above alcoholic solution of the base, and stirred for 1 hour at room temperature, followed by removing the precipitate of potassium chloride by filtration, to obtain a clear ionic liquid [A336][OH]; 0.08 mol P507 is added to the obtained 0.1 mol [A336][OH] and stirred for 2 hours at room temperature, the upper organic phase of the ionic liquid is obtained, washed with deionized water for three times, followed by vacuum distillation to recover the solvent ethanol, and the product is vacuum dried to obtain [A336][P507].

In addition, di-2-ethylhexyl phosphoric acid trialkyl methyl ammonium ([A336][P204]) is prepared specifically as follows: after [A336][OH] is obtained according to the above method, 0.08 mol P204 is added to the obtained 0.1 mol [A336][OH] and stirred for 1 hour at room temperature, the upper organic phase of the ionic liquid is obtained, washed with deionized water for three times, followed by vacuum distillation to recover the solvent ethanol, and the product is vacuum dried to obtain [A336][P204].

According to the present invention, the extracting the rare-earth element from the aqueous solution of rare-earth chloride into n-heptane includes: mixing the solution of the quaternary ammonium ionic liquid extractant in n-heptane, the salting-out agent and the aqueous solution of rare-earth chloride, and extracting the rare-earth element from the aqueous solution of rare-earth chloride into n-heptane, the quaternary ammonium ionic liquid extractant being 2-ethylhexyl phosphonic acid mono-2-ethylhexyl ester trialkyl methyl ammonium or di-2-ethylhexyl phosphoric acid trialkyl methyl ammonium. Preferably, the mixing the solution of the quaternary ammonium ionic liquid extractant in n-heptane, the salting-out agent and the aqueous solution of rare-earth chloride further preferably comprises: shaking at a constant temperature of 25° C., preferably for 1 hour, and determining the concentration of the rare-earth element in the aqueous phase, thereby to calculate the extraction rate and distribution ratio of the rare-earth element.

In addition, the present invention preferably further comprises using NaCl with a concentration of 0.2~1.5 mol/L as a salting-out agent, and the NaCl preferably has a concentration of 0.5~1.2 mol/L, and more preferably of 0.6~1.0 mol/L. When the concentration is less than 0.2 mol/L, the extraction rate of the rare-earth ions is very low, which is not easy to be detected and calculated; while when the concentration is more than 1.5 mol/L, the rare-earth ions are extracted completely, which is not easy to be detected and calculated. In addition, the extraction temperature will have a certain effect on extraction and separation results of the rare-earth element, and too high or too low extraction temperature is adverse to the extraction and separation of the rare-earth element. The extraction temperature used in the present invention is preferably 20~50° C., more preferably 20~30° C. The solution of the quaternary ammonium ionic liquid extractant in n-heptane mentioned above has a concentration of 0.01~0.08 mol/L, more preferably of 0.03~0.06 mol/L, and more preferably of 0.05 mol/L.

There is no particular limitation on the rare-earth element in the aqueous solution of rare-earth chloride in the present invention, which may be a single rare-earth element or a plurality of rare-earth elements known to those skilled in the art. As a preferred embodiment, the rare-earth element is one or more of La, Ce, Pr, Nd, Sm, Eu, Gd, Tb, Dy, Ho, Er, Tm, Yb, Lu and Y. In addition, the aqueous solution of rare-earth chloride preferably has a concentration of $7\sim11\times10^{-4}$ mol/L, more preferably of $7\sim8\times10^{-4}$ mol/L, and more preferably of $7.5\times10^{-4}$ mol/L.

After extracting the rare-earth element from the aqueous solution of rare-earth chloride into n-heptane according to the above method, the aqueous solution of rare-earth chloride is preferably controlled to have a pH of 1~5. In addition, the present invention preferably further comprises: stripping the rare-earth elements which have been extracted into the n-heptane using a hydrochloric acid solution. Preferably, the hydrochloric acid solution has a concentration of 0.03~0.20 mol/L, and more preferably of 0.1~0.2 mol/L. When the concentration is less than 0.03 mol/L, the stripping rate of some rare-earth ions is relatively low, which is not easy to be detected and calculated.

After completing the extraction and separation process, the rare-earth element in the raffinate or stripped solution obtained in the present invention is preferably determined by using arsenazo (III) colorimetry. The calculation formulas for extraction rate (E), distribution ratio (D) and separation factor (β) are as follows:

$$E(\%) = \frac{(C_{aq,o} - C_{aq})}{C_{aq,o}} \times 100$$

$$D = \frac{(C_{aq,o} - C_{aq})V_{aq}}{C_{aq}V_{org}}$$

$$\beta = \frac{D_1}{D_2}$$

wherein $C_{aq,o}$ and $C_{aq}$ are the initial concentration and equilibrium concentration of the rare-earth ions in the aqueous phase respectively, and $V_{aq}$ and $V_{org}$ are the volume of the aqueous phase and the organic phase respectively.

Taken together, the present invention is applied to separation of rare-earths in a nitric acid system with [A336][P507] or [A336][P204] as an extractant, and with n-heptane as a diluent, which has the following advantages of: reduced extraction acidity and reduced acid consumption; providing good interfacial phenomena without generation of emulsification; obviating need for extractant saponification and obviating need for adding other aids, saving the cost, having high separation factor for rare-earth elements.

When used in a sulfuric acid system:

the present invention provides a method for extracting and separating a rare-earth element in a sulfuric acid system, comprising:

extracting the rare-earth element from an aqueous solution of rare-earth sulfate into n-heptane, by using 2-ethylhexyl phosphonic acid mono-2-ethylhexyl ester trialkyl methyl ammonium as an extractant and n-heptane as a diluent.

An extractant saponification is needed to separate a single rare-earth element in an acidic system with the existing acid extractants, and it will lead to a changing of the composition during a long-term operation, therefore, the present invention separates a single rare-earth element in a sulfuric acid system with 2-ethylhexyl phosphonic acid mono-2-ethylhexyl ester trialkyl methyl ammonium ([A336][P507]) as an extractant, which may not only avoid saponification, but also avoid changing of the composition during the long-term operation, and the process has low extraction acidity and increased separation factor for the rare-earth elements.

According to the present invention, the [A336][P507] has a structure shown in Formula I.

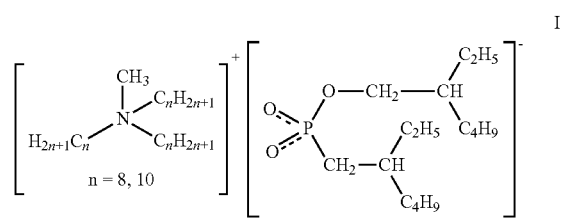

The present invention preferably synthesizes 2-ethylhexyl phosphonic acid mono-2-ethylhexyl ester trialkyl methyl ammonium by itself, wherein 2-ethylhexyl phosphonic acid mono-2-ethylhexyl ester trialkyl methyl ammonium ([A336][P507]) is preferably prepared by a method as follows:

5.6 g of 0.10 mol potassium hydroxide is dissolved into 56 ml ethanol to obtain an alcoholic solution of the base, 40 g of 0.1 mol quaternary ammonium sulfate 336 is weighed and added dropwise to the above alcoholic solution of the base, and stirred for 1 hour at room temperature, followed by removing the precipitate of potassium sulfate by filtration, to obtain a clear ionic liquid [A336][OH]; 0.08 mol P507 is added to the obtained 0.1 mol [A336][OH] and stirred for 2 hours at room temperature, the upper organic phase of the ionic liquid is obtained, washed with deionized water for three times, followed by vacuum distillation to recover the solvent ethanol, and the product is vacuum dried to obtain [A336][P507].

According to the present invention, the extracting the rare-earth element from the aqueous solution of rare-earth sulfate into n-heptane includes: mixing a solution of the quaternary ammonium ionic liquid extractant in n-heptane, the salting-out agent and the aqueous solution of rare-earth sulfate, and extracting the rare-earth element from the aqueous solution of rare-earth sulfate into n-heptane, the quaternary ammonium ionic liquid extractant being 2-ethylhexyl phosphonic acid mono-2-ethylhexyl ester trialkyl methyl ammonium. Preferably, the mixing the solution of the quaternary ammonium ionic liquid extractant in n-heptane, the salting-out agent and the aqueous solution of rare-earth sulfate further preferably comprises: shaking at a constant temperature of 25° C., preferably for 1 hour, and determining the concentration of the rare-earth element in the aqueous phase, thereby to calculate the extraction rate and distribution ratio of the rare-earth element.

In addition, the present invention preferably further comprises using $Na_2SO_4$ with a concentration of 0.1~1 mol/L as a salting-out agent, and the $Na_2SO_4$ preferably has a concentration of 0.3~0.9 mol/L, and more preferably of 0.5~0.7 mol/L. When the concentration is less than 0.1 mol/L, the extraction rate of the rare-earth ions is very low, which is not easy to be detected and calculated; while when the concentration is more than 1.0 mol/L, the rare-earth ions are extracted completely, which is as well not easy to be detected and calculated. In addition, the extraction temperature will have a certain effect on extraction and separation results of the rare-earth element, and too high or too low extraction temperature is adverse to the extraction and separation of the rare-earth element. The extraction temperature used in the present invention is preferably 25~50° C., more preferably 25~30° C. The solution of the quaternary ammonium ionic liquid extractant in n-heptane mentioned above has a concentration of 0.02~0.08 mol/L, more preferably of 0.03~0.06 mol/L, and more preferably of 0.05 mol/L.

There is no particular limitation on the rare-earth element in the aqueous solution of rare-earth sulfate in the present invention, which may be a single rare-earth element or a plurality of rare-earth elements known to those skilled in the art. As a preferred embodiment, the rare-earth element is one or more of La, Ce, Pr, Nd, Sm, Eu, Gd, Tb, Dy, Ho, Er, Tm, Yb, Lu and Y. In addition, the aqueous solution of rare-earth sulfate preferably has a concentration of $7~9\times10^{-4}$ mol/L, more preferably of $7~8\times10^{-4}$ mol/L, and more preferably of $7.5\times10^{-4}$ mol/L.

After extracting the rare-earth element from the aqueous solution of rare-earth sulfate into n-heptane according to the above method, the aqueous solution of rare-earth sulfate is preferably controlled to have a pH of 1~7. In addition, the present invention preferably further comprises: stripping the rare-earth elements which have been extracted into the n-heptane using a sulfuric acid solution. Preferably, the sulfuric acid solution has a concentration of 0.01~0.1 mol/L, and more preferably of 0.05~0.1 mol/L. When the concentration is less than 0.01 mol/L, the stripping rate of some rare-earth ions is relatively low, which is not easy to be detected and calculated.

After completing the extraction and separation process, the rare-earth element in the raffinate or stripped solution obtained in the present invention is preferably determined by using arsenazo (III) colorimetry. The calculation formulas for extraction rate (E), distribution ratio (D) and separation factor (β) are as follows:

$$E(\%) = \frac{(C_{aq,o} - C_{aq})}{C_{aq,o}} \times 100$$

$$D = \frac{(C_{aq,o} - C_{aq})V_{aq}}{C_{aq}V_{org}}$$

$$\beta = \frac{D_1}{D_2}$$

wherein $C_{aq,0}$ and $C_{aq}$ are the initial concentration and equilibrium concentration of the rare-earth ions in the aqueous phase respectively, and $V_{aq}$ and $V_{org}$ are the volume of the aqueous phase and the organic phase respectively.

Taken together, the present invention is applied to separation of rare-earths in a sulfuric acid system with [A336][P507] as an extractant, and with n-heptane as a diluent which has the following advantages of: reduced extraction acidity and reduced acid consumption; providing good interfacial phenomena without generation of emulsification; obviating need for extractant saponification and obviating need for adding other aids, saving the cost, as well as a high separation factor for rare-earth elements.

In order to further illustrate the technical solutions of the present invention, preferred embodiments of the present invention will be described in conjunction with examples as follows, however, it should be understood that these descriptions are only for further illustrating the features and advantages of the present invention, rather than limiting claims of the present application.

Chemical reagents employed in the examples of the present invention are all commercially available.

EXAMPLE 1

112.36 g of quaternary ammonium chloride 336 was weighed and dissolved into 500 mL distilled isopropanol completely; 6.39 g of metallic sodium was added into a plastic bottle, and then added 125 mL distilled isopropanol and reacted for 3 hours at room temperature to prepare sodium alcoholate; the solutions mentioned above were mixed and stirred for 4 hours at 50° C., to prepare [A336][OR]; the resulting solution was centrifuged for 10 minutes at 8000 rpm to remove the precipitate of sodium chloride; 500 mL deionized water was added to the filtrate and shaken for 30 minutes to prepare [A336][OH] through hydrolysis.

Taking 172 mL [A336][OH] solution with a concentration of 0.121 mol/L, 6.2455 g of P507 (the molar ratio of [A336][OH] to 507 is 1.1:1) was added thereto, the solution was stirred with reflux for 12 hours at 50° C., and after the resulting solution was left standing for phase separation, the lower phase was discarded, and the upper phase was rotated to remove the contained isopropanol and water at 80° C. and 20 mbar, to obtain [A336][P507].

EXAMPLE 2

112.36 g of quaternary ammonium chloride 336 was weighed and dissolved into 500 mL distilled isopropanol completely; 6.39 g of metallic sodium was added into a plastic bottle, and then 125 mL distilled isopropanol is added and reacted for 3 hours at room temperature to prepare sodium alcoholate; the forging solutions were mixed and stirred for 4 hours at 50° C., to prepare [A336][OR]; the resulting solution was centrifuged for 10 minutes at 8000 rpm to remove the precipitate of sodium chloride; 500 mL deionized water was added to the filtrate and shaken for 30 minutes to prepare [A336][OH] through hydrolysis.

Taking 192 mL [A336][OH] solution with a concentration of 0.111 mol/L, 8.0057 g of P204 (the molar ratio of [A336][OH] to P204 is 1.1:1) was added thereto, the solution was stirred with reflux for 12 hours at 50° C., and after the resulting solution was left standing for phase separation, the lower phase was discarded, and the upper phase was rotated to remove the contained isopropanol and water at 80° C. and 20 mbar, to obtain [A336][P204].

EXAMPLE 3

Extraction and separation of a single rare-earth ion by [A336][P507].

1.0 mL of 0.05 mol/L solution of [A336][P507] in n-heptane was mixed with 5.0 mL of aqueous solution containing $NaNO_3$ and Ho(III), wherein the aqueous solution had a $NaNO_3$ concentration of 1.0 mol/L, and a Ho(III) concentration of $7.5 \times 10^{-4}$ mol/L. After shaking at a constant temperature of 25° C. for 1 hour, the Ho(III) concentration in the aqueous phase was determined, thereby to calculate the extraction rate and distribution ratio of Ho(III).

EXAMPLES 4~7

By employing the same extraction method as example 3, the extraction rate and distribution ratio of Er(III), Tm(III), Yb(III) and Lu(III) were obtained respectively. Based on the system equilibrium pH=1.50, the distribution factors (β) between different heavy rare-earth ions were calculated, the results are shown in table 1.

TABLE 1

Separation factor between rare-earth ions with [A336][P507] as an extractant.

| RE(III) | Er | Tm | Yb | Lu |
|---|---|---|---|---|
| Ho | 5.63 | 18.13 | 78.13 | 83.54 |
| Er |  | 3.22 | 13.88 | 14.84 |
| Tm |  |  | 4.31 | 4.61 |
| Yb |  |  |  | 1.07 |

It can be seen from table 1 that the separation factor between heavy rare-earth ions is relative large, therefore, the extraction and separation method provided in the present invention had high separation factor for heavy rare-earth elements.

EXAMPLE 8

Extraction and separation of a single rare-earth ion by [A336][P204].

1.0 mL of 0.05 mol/L solution of [A336][P204] in n-heptane was mixed with 5.0 mL of aqueous solution containing $NaNO_3$ and Ho(III), wherein the aqueous solution had a $NaNO_3$ concentration of 1.0 mol/L, and a Ho(III) concentration of $7.5 \times 10^{-4}$ mol/L. After shaking at a constant temperature of 25° C. for 1 hour, the Ho(III) concentration in the aqueous phase was determined, thereby to calculate the extraction rate and distribution ratio of Ho(III).

EXAMPLES 9~12

By employing the same extraction method as example 8, the extraction rate and distribution ratio of Er(III), Tm(III), Yb(III) and Lu(III) were obtained respectively. Based on the system equilibrium pH=1.50, the distribution factors (β) between different heavy rare-earth ions were calculated, the results are shown in table 2.

TABLE 2

Separation factor between rare-earth ions with [A336][P204] as an extractant.

| RE(III) | Er | Tm | Yb | Lu |
|---|---|---|---|---|
| Ho | 6.93 | 23.27 | 184.33 | 1576.57 |
| Er |  | 3.36 | 26.59 | 227.46 |
| Tm |  |  | 7.92 | 67.75 |
| Yb |  |  |  | 8.55 |

It can be seen from table 2 that the separation factor between heavy rare-earth ions are relative large, therefore, the extraction and separation method provided in the present invention had high separation factor for heavy rare-earth elements.

EXAMPLE 13

Effects of the equilibrium pH values of a solution on distribution ratio of extraction of a single rare-earth ion by [A336][P507]

1.0 mL of 0.05 mol/L solution of [A336][P507] in n-heptane was mixed with 5.0 mL of aqueous solution containing $NaNO_3$ and La(III), wherein the aqueous solution had a $NaNO_3$ concentration of 1.0 mol/L, and a La(III) concentration of $7.5 \times 10^{-4}$ mol/L, and shaken at a constant temperature of 25° C. for 1 hour. The equilibrium pH value of the aqueous phase and the La(III) concentration in the corresponding aqueous phase were determined respectively, and the extraction distribution ratio was calculated. When the equilibrium pH values of solutions were different, the extraction distribution ratio would vary.

EXAMPLES 14~27

By employing the same extraction method as example 13, the extraction distribution ratios of Ce(III), Pr(III), Nd(III), Sm(III), Eu(III), Gd(III), Tb(III), Dy(III), Ho(III), Er(III), Tm(III), Yb(III), Lu(III) and Y(III) were obtained respectively, that is, the extraction distribution ratios of different rare-earth ions at different pH were obtained.

FIG. 1 is a point diagram of equilibrium pH values of a solution versus extraction distribution ratios of different rare-earth ions with [A336][P507] as an extractant. It can be seen from the figure that the distribution ratio of the rare-earth ions was increased as the equilibrium pH value increased. It can be obtained by determining the equilibrium pH value that, the equilibrium pH value ranged from 1 to 4, the extraction process of each of the different rare-earth ions may complete, and this extractant had reduced extraction acidity.

EXAMPLE 28

Effects of the equilibrium pH values of a solution on distribution ratio of extraction of a single rare-earth ion by [A336][P204]

1.0 mL of 0.05 mol/L solution of [A336][P204] in n-heptane was mixed with 5.0 mL of aqueous solution containing $NaNO_3$ and La(III), wherein the aqueous solution had a $NaNO_3$ concentration of 1.0 mol/L, and a La(III) concentration of $7.5 \times 10^{-4}$ mol/L, and shaken at a constant temperature of 25° C. for 1 hour. The equilibrium pH value of the aqueous phase and the La(III) concentration in the corresponding aqueous phase were determined respectively, and the extraction distribution ratio was calculated. When the equilibrium pH values of solutions were different, the extraction distribution ratio would vary.

EXAMPLES 29~42

By employing the same extraction method as example 28, the extraction distribution ratios of Ce(III), Pr(III), Nd(III), Sm(III), Eu(III), Gd(III), Tb(III), Dy(III), Ho(III), Er(III), Tm(III), Yb(III), Lu(III) and Y(III) were obtained respectively, that is, the extraction distribution ratios of different rare-earth ions at different pH were obtained.

Figure 2:
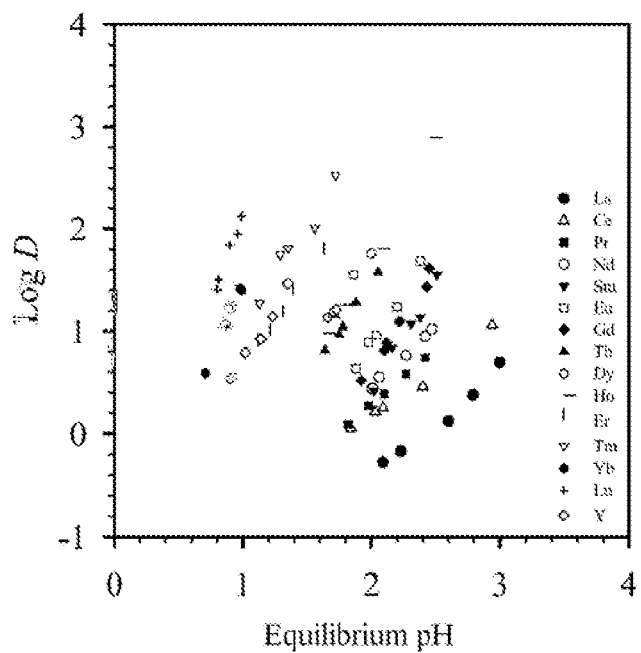
FIG. 2 is a point diagram of equilibrium pH values of a solution versus extraction distribution ratios of rare-earth ions with [A336][P204] as an extractant, provided in Examples 28~42 of the present invention.

FIG. 2 is a point diagram of equilibrium pH values of a solution versus extraction distribution ratios of different rare-earth ions with [A336][P204] as an extractant. It can be seen from the figure that the distribution ratio of the rare-earth ions was increased as the equilibrium pH value increased. It can be obtained by determining the equilibrium pH value that, the equilibrium pH value ranged from 1 to 3, the extraction process of each of the different rare-earth ions may complete, and this extractant had reduced extraction acidity.

EXAMPLE 43

Effect of the concentration of the salting-out agent on extraction of a single rare-earth ion by [A336][P507].

1.0 mL of 0.05 mol/L solution of [A336][P507] in n-heptane was mixed with 5.0 mL of aqueous solution containing $NaNO_3$ and La(III), wherein the aqueous solution had a $NaNO_3$ concentration of 0.2~1.5 mol/L, and a La(III) concentration of $7.5 \times 10^{-4}$ mol/L, and shaken at a constant temperature of 25° C. for 1 hour. The La(III) concentration in the aqueous phase was determined at different concentrations of the salting-out agent respectively, and the extraction rate was calculated. When the concentrations of the salting-out agent were different, the extraction rate would vary.

EXAMPLES 44~45

Figure 3:
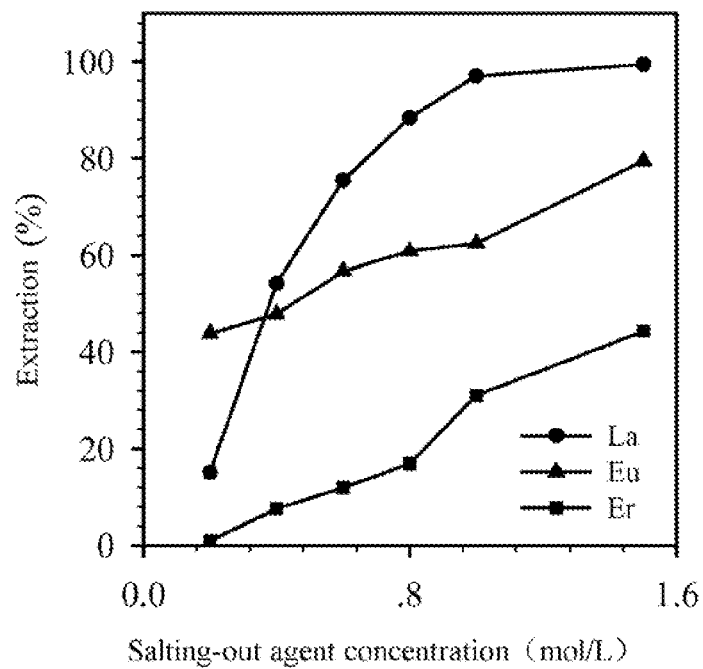
FIG. 3 is a graph of salting-out agent concentrations versus the extraction rate of rare-earths with [A336][P507] as an extractant, provided in examples 43~45 of the present invention.

By employing the same extraction method as example 43, extraction rate of Eu(III) and Er(III) were obtained respectively, and the results were shown in FIG. 3.

It can be seen from FIG. 3 that, the extraction rate was increased as the concentration of the salting-out agent increased, therefore, the addition of the salting-out agent facilitates extraction.

EXAMPLE 46

Effect of the concentration of the salting-out agent on extraction of a single rare-earth ion by [A336][P204].

1.0 mL of 0.05 mol/L solution of [A336][P204] in n-heptane was mixed with 5.0 mL of aqueous solution containing $NaNO_3$ and La(III), wherein the aqueous solution had a $NaNO_3$ concentration of 0.2~1.5 mol/L, and a La(III) concentration of $7.5 \times 10^{-4}$ mol/L, and shaken at a constant temperature of 25° C. for 1 hour. The La(III) concentration in the aqueous phase was determined at different concentrations of the salting-out agent respectively, and the extraction rate was calculated. When the concentrations of the salting-out agent were different, the extraction rate would vary.

EXAMPLES 47~48

Figure 4:
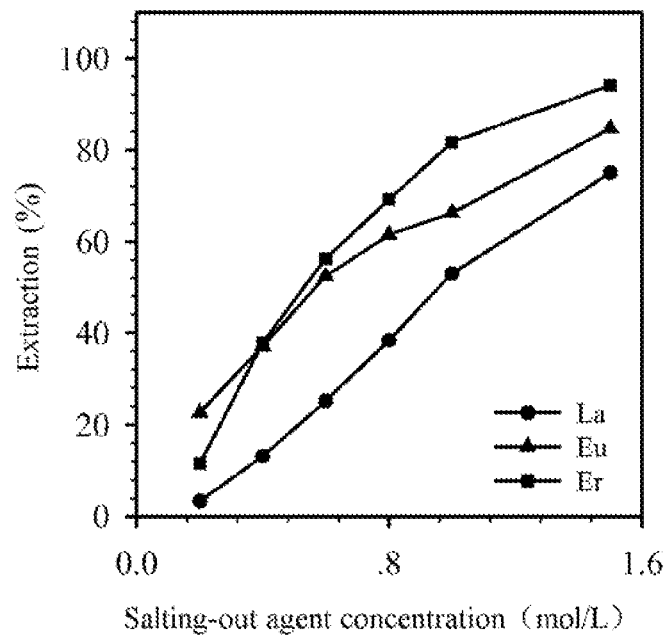
FIG. 4 is a graph of salting-out agent concentrations versus the extraction rate of rare-earths with [A336][P204] as an extractant, provided in examples 46~48 of the present invention.

By employing the same extraction method as example 46, extraction rate of Eu(III) and Er(III) were obtained respectively, and the results were shown in FIG. 4.

It can be seen from FIG. 4 that, the extraction rate was increased as the concentration of the salting-out agent increased, therefore, the addition of the salting-out agent facilitates extraction.

EXAMPLE 49

Stripping experiment on [A336][P507] loaded with rare-earth ions for $HNO_3$ solution.

1.0 mL of a n-heptane solution of [A336][P507] loaded with La(III) ions was mixed with 5.0 mL $HNO_3$ solution with a concentration of 0.04~0.50 mol/L respectively, and shaken at a constant temperature of 25° C. for 1 hour, and then the stripping rate of La(III) ions was determined when stripped with different concentrations of stripping solutions.

EXAMPLES 50~51

Figure 5:
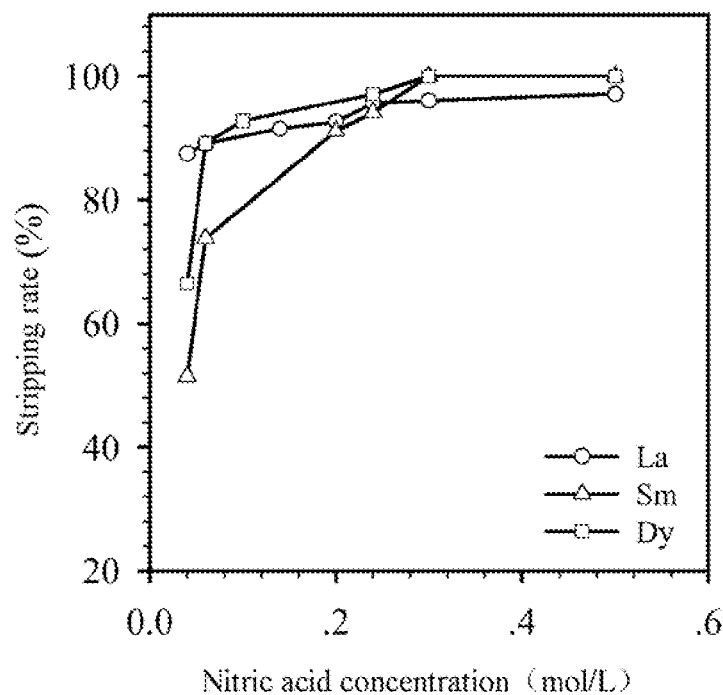
FIG. 5 is a graph of $HNO_3$ solution concentrations versus the stripping rate of loaded rare-earth ions with [A336][P507] as an extractant, provided in examples 49~51 of the present invention.

The extraction rate of Sm(III) and Dy(III) were obtained by employing steps of example 49, respectively, and the results were shown in FIG. 5.

It can be seen from FIG. 5 that when the $HNO_3$ concentration reached up to 0.30 mol/L, the stripping of the rare-earth ions may essentially complete, and the stripping acidity is low and the stripping process is easy.

EXAMPLE 52

Stripping experiment on [A336][P204] loaded with rare-earth ions for $HNO_3$ solution.

1.0 mL of a n-heptane solution of [A336][P204] loaded with La(III) ions was mixed with 5.0 mL $HNO_3$ solution with a concentration of 0.04~0.50 mol/L respectively, and shaken at a constant temperature of 25° C. for 1 hour, and then the stripping rate of La(III) ions was determined when stripped with different concentrations of stripping solutions.

EXAMPLES 53~54

Figure 6:
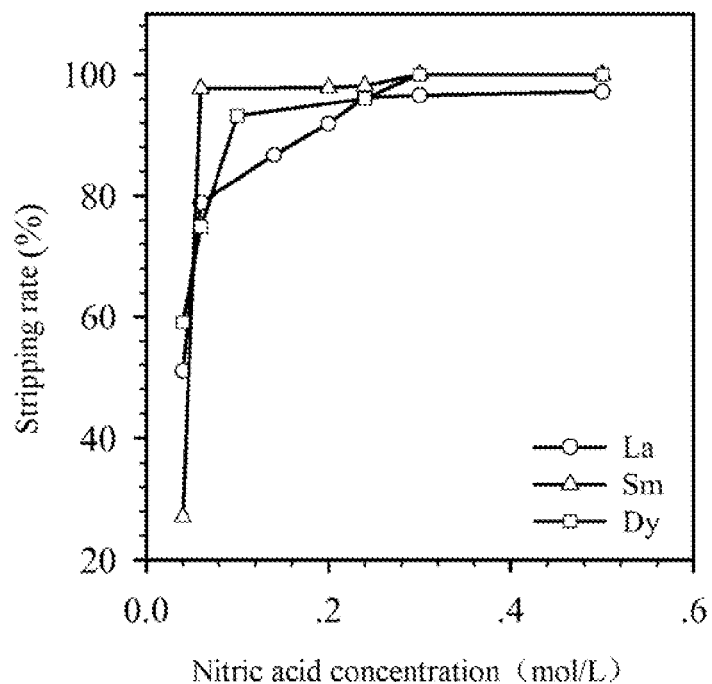
FIG. 6 is a graph of $HNO_3$ solution concentrations versus the stripping rate of loaded rare-earth ions with [A336][P204] as an extractant, provided in examples 52~54 of the present invention.

The extraction rate of Sm(III) and Dy(III) were obtained by employing steps of example 52, respectively, and the results were shown in FIG. 6.

It can be seen from FIG. 6 that when the $HNO_3$ concentration reached up to 0.30 mol/L, the stripping of the rare-earth ions may essentially complete, and the stripping acidity is low and the stripping process is easy.

EXAMPLES 55~69

Separation factors of the extractant [A336][P507] for Y(III) and other rare-earth ions.

1.0 mL of 0.05 mol/L solution of [A336][P507] in n-heptane was mixed with 5.0 mL of aqueous solution containing $NaNO_3$ and La(III), wherein the aqueous solution had a $NaNO_3$ concentration of 1.0 mol/L, and a La(III) concentration of $7.5 \times 10^{-4}$ mol/L, and shaken at a constant temperature of 25° C. for 1 hour. The La(III) concentration in the aqueous phase was determined, thereby to calculate the extraction rate and distribution ratio of La(III).

According to the above steps, the distribution ratios of Ce(III), Pr(III), Nd(III), Sm(III), Eu(III), Gd(III), Tb(III), Dy(III), Ho(III), Er(III), Tm(III), Yb(III), Lu(III) and Y(III) were obtained respectively. Based on the system equilibrium pH value=1.50, the distribution factor (β) between different heavy rare-earth ions was calculated.

EXAMPLES 70~84

Separation factors of the extractant [A336][P204] for Y(III) and other rare-earth ions.

1.0 mL of 0.05 mol/L solution of [A336][P204] in n-heptane was mixed with 5.0 mL of aqueous solution containing $NaNO_3$ and La(III), wherein the aqueous solution had a $NaNO_3$ concentration of 1.0 mol/L, and a La(III) concentration of $7.5\times10^{-4}$ mol/L, and shaken at a constant temperature of 25° C. for 1 hour. The La(III) concentration in the aqueous phase was determined, thereby to calculate the extraction rate and distribution ratio of La(III).

According to the above steps, the distribution ratios of Ce(III), Pr(III), Nd(III), Sm(III), Eu(III), Gd(III), Tb(III), Dy(III), Ho(III), Er(III), Tm(III), Yb(III), Lu(III) and Y(III) were obtained respectively. Based on the system equilibrium pH value=1.50, the distribution factor (β) between different heavy rare-earth ions was calculated. Results were shown in table 3.

TABLE 3

Separation factor between Y(III) and other rare-earth ions

| | Y/La | Y/Ce | Y/Pr | Y/Nd | Y/Sm | Y/Eu | Y/Gd | Y/Tb | Y/Dy | Y/Ho | Y/Er | Tm/Y | Yb/Y | Lu/Y |
|---|---|---|---|---|---|---|---|---|---|---|---|---|---|---|
| [A336][P507] | 396.85 | 273.64 | 105.39 | 35.77 | 221.88 | 30.89 | 137.96 | 8.58 | 4.61 | 11.15 | 1.98 | 1.62 | 7.01 | 7.49 |
| [A336][P204] | 430.52 | 98.34 | 92.32 | 72.48 | 235.88 | 68.43 | 110.98 | 15.42 | 8.19 | 10.73 | 1.55 | 2.17 | 17.19 | 146.99 |

It can be seen from table 3 that with [A336][P507] or [A336][P204] as the extractant, the separation factor between Y(III) and other rare-earth ions is relative large, which may achieve the separation of Y(III) and other rare-earth ions.

EXAMPLE 85

Separation factor of the extractant [A336][P204] for mixed heavy rare-earths.

Based on the composition of a thulium ytterbium lutetium concentrate, a mixed solution containing $Tm^{3+}$ $1.1\times10^{-4}$ mol/L, $Yb^{3+}$ $7.2\times10^{-4}$ mol/L and $Lu^{3+}$ $1.3\times10^{-4}$ mol/L was formulated.

1.0 mL of 0.05 mol/L solution of [A336][P204] in n-heptane was mixed with 5.0 mL of a mixed solution having a $NaNO_3$ concentration of 1.0 mol/L, and a concentration of $1.1\times10^{-4}$ mol/L, $7.2\times10^{-4}$ mol/L and $1.3\times10^{-4}$ mol/L for Tm(III), Yb(III) and Lu(III) respectively, and shaken at a constant temperature of 25° C. for 1 hour. The Tm(III), Yb(III) and Lu(III) concentrations in the aqueous phase were determined, and the extraction rate, and the separation factor (β) between different rare-earth ions were calculated. Results were shown in table 4. And it can be seen from table 4 that, in the mixed system, the separation factor of Tm(III), Yb(III) and Lu(III) is relative large.

TABLE 4

Separation factor between different heavy rare-earth ions in a mixed system

| RE(III) | Yb | Lu |
|---|---|---|
| Tm | 3.31 | 6.13 |
| Yb | | 1.85 |

EXAMPLE 86

5.6 g of 0.10 mol potassium hydroxide was dissolved into 56 ml ethanol to obtain an alcoholic solution of the base, 40 g of 0.1 mol quaternary ammonium chloride 336 was weighed and added dropwise to the above alcoholic solution of the base, and stirred for 1 hour at room temperature, followed by removing the precipitate of potassium chloride by filtration, to obtain a clear ionic liquid [A336][OH]; 0.08 mol P507 was added to the obtained 0.1 mol [A336][OH] and stirred for 2 hours at room temperature, the upper organic phase of the ionic liquid was obtained, washed with deionized water for three times, followed by vacuum distillation to recover the solvent ethanol, and the product was vacuum dried to obtain [A336][P507].

EXAMPLE 87

5.6 g of 0.10 mol potassium hydroxide was dissolved into 56 ml ethanol to obtain an alcoholic solution of the base, 40 g of 0.1 mol quaternary ammonium chloride 336 was weighed and added dropwise to the above alcoholic solution of the base, and stirred for 1 hour at room temperature, followed by removing the precipitate of potassium chloride by filtration, to obtain a clear ionic liquid [A336][OH]; 0.08 mol P204 was added to the obtained 0.1 mol [A336][OH] and stirred for 1 hour at room temperature, and the upper organic phase of the ionic liquid was obtained, washed with deionized water for three times, followed by vacuum distillation to recover the solvent ethanol, and the product was vacuum dried to obtain [A336][P204].

EXAMPLE 88

Extraction and separation of a single rare-earth ion by [A336][P507].

1.0 mL of 0.05 mol/L solution of [A336][P507] in n-heptane was mixed with 5.0 mL of aqueous solution containing NaCl and La(III), wherein the aqueous solution had a NaCl concentration of 1.0 mol/L, and a La(III) concentration of $7.5\times10^{-4}$ mol/L. After shaking at a constant temperature of 25° C. for 1 hour, the La(III) concentration in the aqueous phase was determined, thereby to calculate the extraction rate and distribution ratio of La(III).

EXAMPLES 89~92

By employing the same extraction method as example 88, the extraction rate and distribution ratio of Ce(III), Pr(III), Nd(III) and Sm(III) were obtained respectively. Based on the system equilibrium pH=2.50, the distribution factor (β) between different rare-earth ions was calculated, the results are shown in table 5.

TABLE 5

Separation factor between rare-earth ions with [A336][P507] as an extractant.

| RE(III) | Ce | Pr | Nd | Sm |
|---|---|---|---|---|
| La | 2.03 | 2.62 | 24.92 | 117.12 |
| Ce |  | 1.29 | 12.28 | 57.70 |
| Pr |  |  | 9.52 | 44.74 |
| Nd |  |  |  | 4.70 |

It can be seen from table 5 that the separation factor between the above light rare-earth ions is relative large, therefore, the extraction and separation method provided in the present invention had high separation factor for light rare-earth elements.

EXAMPLE 93

Extraction and separation of a single rare-earth ion by [A336][P204].

1.0 mL of 0.05 mol/L solution of [A336][P204] in n-heptane was mixed with 5.0 mL of aqueous solution containing NaCl and La(III), wherein the aqueous solution had a NaCl concentration of 1.0 mol/L, and a La(III) concentration of $7.5 \times 10^{-4}$ mol/L. After shaking at a constant temperature of 25° C. for 1 hour, the La(III) concentration in the aqueous phase was determined, thereby to calculate the extraction rate and distribution ratio of La(III).

EXAMPLES 94~97

By employing the same extraction method as example 93, the extraction rate and distribution ratio of Ce(III), Pr(III), Nd(III) and Sm(III) were obtained respectively. Based on the system equilibrium pH=2.50, the distribution factor (β) between different rare-earth ions was calculated, the results are shown in table 6.

TABLE 6

Separation factor between rare-earth ions with [A336][P204] as an extractant.

| RE(III) | Ce | Pr | Nd | Sm |
|---|---|---|---|---|
| La | 1.14 | 1.49 | 8.35 | 34.58 |
| Ce |  | 1.31 | 7.34 | 30.40 |
| Pr |  |  | 5.61 | 23.25 |
| Nd |  |  |  | 4.14 |

It can be seen from table 6 that the separation factor between the above light rare-earth ions is relative large, therefore, the extraction and separation method provided in the present invention had high separation factor for light rare-earth elements.

EXAMPLE 98

Effects of the equilibrium pH values of a solution on distribution ratio of extraction of a single rare-earth ion by [A336][P507]

1.0 mL of 0.05 mol/L solution of [A336][P507] in n-heptane was mixed with 5.0 mL of aqueous solution containing NaCl and La(III), wherein the aqueous solution had a NaCl concentration of 1.0 mol/L, and a La(III) concentration of $7.5 \times 10^{-4}$ mol/L, and shaken at a constant temperature of 25° C. for 1 hour. The equilibrium pH value of the aqueous phase and the La(III) concentration in the corresponding aqueous phase were determined respectively, and the extraction distribution ratio was calculated. When the equilibrium pH values of solutions were different, the extraction distribution ratio would vary.

EXAMPLES 99~112

By employing the same extraction method as example 98, the extraction distribution ratios of Ce(III), Pr(III), Nd(III), Sm(III), Eu(III), Gd(III), Tb(III), Dy(III), Ho(III), Er(III), Tm(III), Yb(III), Lu(III) and Y(III) were obtained respectively, that is, the extraction distribution ratios of different rare-earth ions at different pH were obtained.

Figure 7:
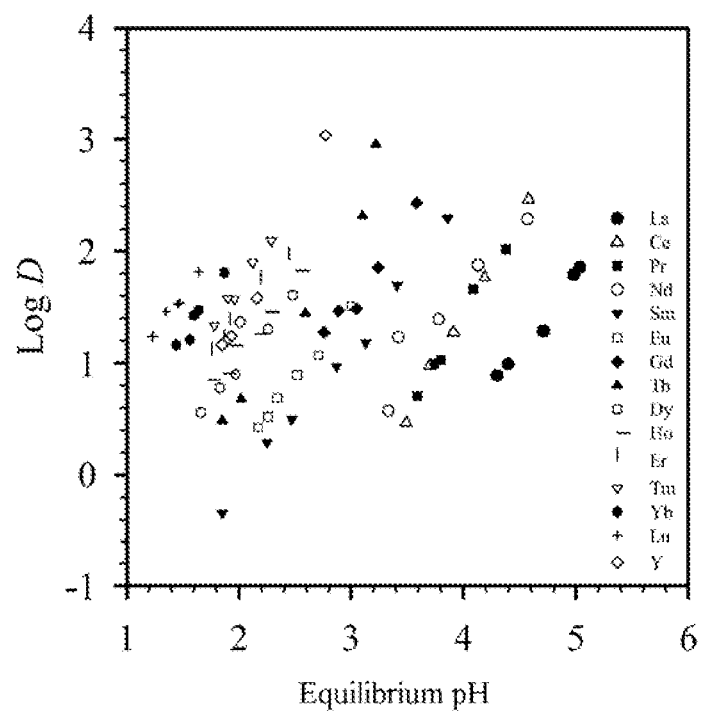
FIG. 7 is a point diagram of equilibrium pH values of a solution versus extraction distribution ratios of rare-earth ions with [A336][P507] as an extractant, provided in examples 98~112 of the present invention.

FIG. 7 is a point diagram of equilibrium pH values of a solution versus extraction distribution ratios of rare-earth ions with [A336][P507] as an extractant. It can be seen from the figure that the distribution ratio of the rare-earth ions was increased as the equilibrium pH value increased. It can be obtained by determining the equilibrium pH value that, the equilibrium pH value ranged from 1 to 5, the extraction process of each of the different rare-earth ions may complete, and this extractant had reduced extraction acidity.

EXAMPLE 113

Effects of the equilibrium pH values of a solution on distribution ratio of extraction of a single rare-earth ion by [A336][P204]

1.0 mL of 0.05 mol/L solution of [A336][P204] in n-heptane was mixed with 5.0 mL of aqueous solution containing NaCl and La(III), wherein the aqueous solution had a NaCl concentration of 1.0 mol/L, and a La(III) concentration of $7.5 \times 10^{-4}$ mol/L, and shaken at a constant temperature of 25° C. for 1 hour. The equilibrium pH value of the aqueous phase and the La(III) concentration in the corresponding aqueous phase were determined respectively, and the extraction distribution ratio was calculated. When the equilibrium pH values of solutions were different, the extraction distribution ratio would vary.

EXAMPLES 114~127

By employing the same extraction method as example 113, the extraction distribution ratios of Ce(III), Pr(III), Nd(III), Sm(III), Eu(III), Gd(III), Tb(III), Dy(III), Ho(III), Er(III), Tm(III), Yb(III), Lu(III) and Y(III) were obtained respectively, that is, the extraction distribution ratios of different rare-earth ions at different pH were obtained.

Figure 8:
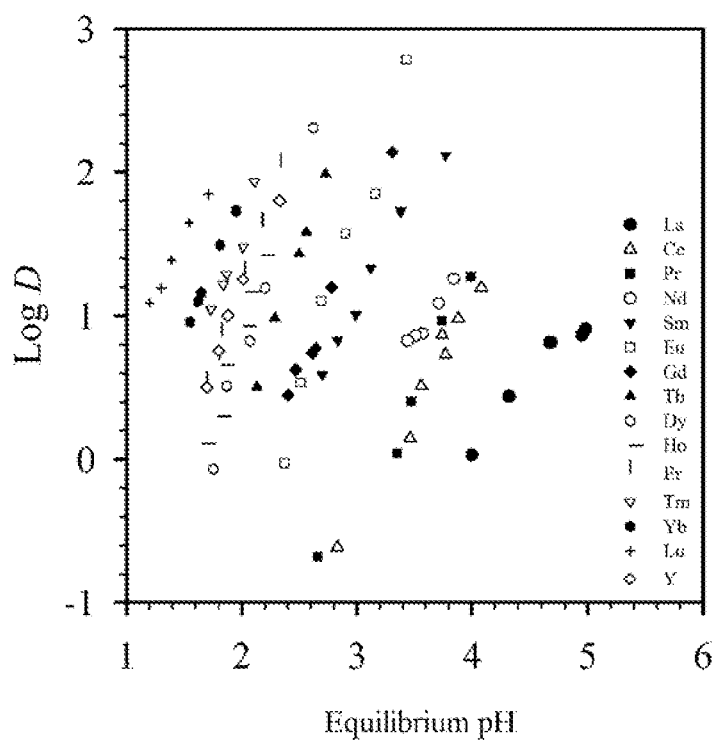
FIG. 8 is a point diagram of equilibrium pH values of a solution versus extraction distribution ratios of rare-earth ions with [A336][P204] as an extractant, provided in examples 113~127 of the present invention.

FIG. 8 is a point diagram of equilibrium pH values of a solution versus extraction distribution ratios of different rare-earth ions with [A336][P204] as an extractant. It can be seen from the figure that the distribution ratio of the rare-earth ions was increased as the equilibrium pH value increased. It can be obtained by determining the equilibrium pH value that, the equilibrium pH value ranged from 1 to 5, the extraction process of each of the different rare-earth ions may complete, and this extractant had reduced extraction acidity.

EXAMPLE 128

Effect of the concentration of the salting-out agent on extraction of a single rare-earth ion by [A336][P507].

1.0 mL of 0.05 mol/L solution of [A336][P507] in n-heptane was mixed with 5.0 mL of aqueous solution containing NaCl and La(III), wherein the aqueous solution had a NaCl concentration of 0.2~1.5 mol/L, and a La(III) concentration of 7.5×10⁻⁴ mol/L, and shaken at a constant temperature of 25° C. for 1 hour. The La(III) concentration in the aqueous phase was determined at different concentrations of the salting-out agent respectively, and the distribution ratio was calculated. When the concentrations of the salting-out agent were different, the distribution ratio would vary.

EXAMPLE 129~130

Figure 9:
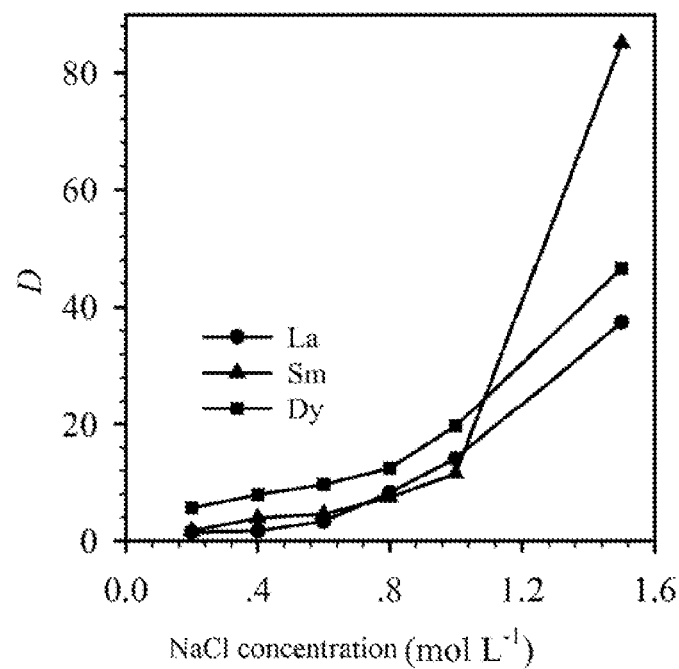
FIG. 9 is a graph of salting-out agent concentrations versus distribution ratios of rare-earths with [A336][P507] as an extractant, provided in examples 128~130 of the present invention.

By employing the same extraction method as example 128, distribution ratio of Sm(III) and Dy(III) were obtained respectively, and the results were shown in FIG. 9.

It can be seen from FIG. 9 that, the distribution ratio was increased as the concentration of the salting-out agent increased, therefore, the addition of the salting-out agent facilitates extraction.

EXAMPLE 131

Effect of the concentration of the salting-out agent on extraction of a single rare-earth ion by [A336][P204].

1.0 mL of 0.05 mol/L solution of [A336][P204] in n-heptane was mixed with 5.0 mL of aqueous solution containing NaCl and La(III), wherein the aqueous solution had a NaCl concentration of 0.2~1.5 mol/L, and a La(III) concentration of $7.5 \times 10^{-4}$ mol/L, and shaken at a constant temperature of 25° C. for 1 hour. The La(III) concentration in the aqueous phase was determined at different concentrations of the salting-out agent respectively, and the distribution ratio was calculated. When the concentrations of the salting-out agent were different, the distribution ratio would vary.

EXAMPLE 132~133

Figure 10:
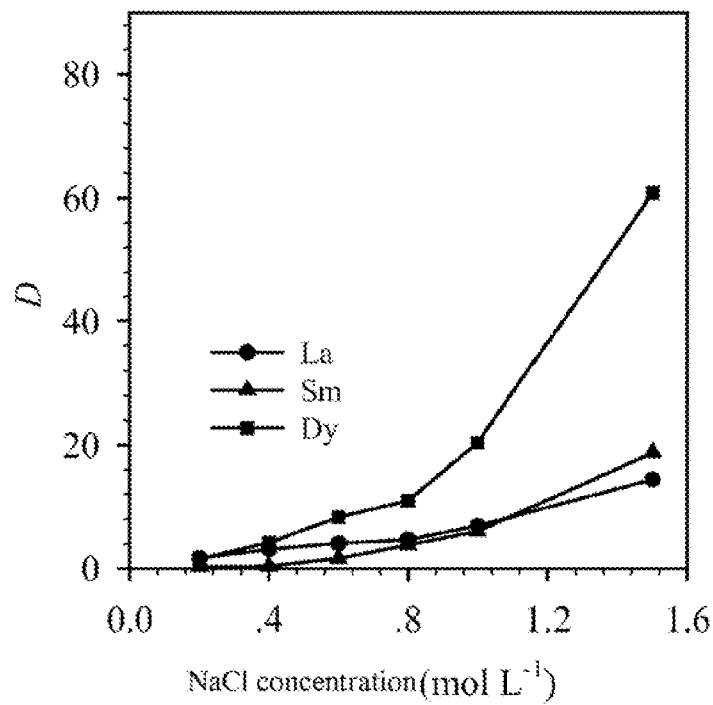
FIG. 10 is a graph of salting-out agent concentrations versus distribution ratios of rare-earths with [A336][P204] as an extractant, provided in examples 131~133 of the present invention.

By employing the same extraction method as example 131, distribution ratio of Sm(III) and Dy(III) were obtained respectively, and the results were shown in FIG. 10.

It can be seen from FIG. 10 that, the distribution ratio was increased as the concentration of the salting-out agent increased, therefore, the addition of the salting-out agent facilitates extraction.

EXAMPLE 134

Stripping experiment on [A336][P507] loaded with rare-earth ions by a HCl solution.

1.0 mL of a n-heptane solution of [A336][P507] loaded with La(III) ions was mixed with 5.0 mL HCl solution with a concentration of 0.03~0.20 mol/L respectively, and shaken at a constant temperature of 25° C. for 1 hour, and then the stripping rate of La(III) ions was determined when stripping with different concentrations of stripping solutions.

EXAMPLES 135~137

Figure 11:
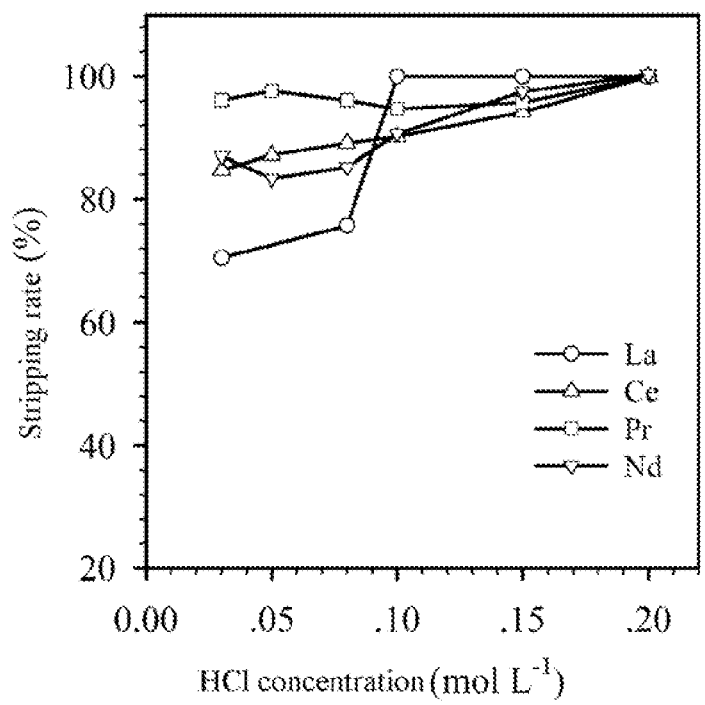
FIG. 11 is a graph of HCl solution concentrations versus the stripping rate of loaded rare-earth ions with [A336][P507] as an extractant, provided in examples 134~137 of the present invention.

The extraction rate of Ce(III), Pr(III) and Nd(III) were obtained respectively, by employing steps of example 134, and the results were shown in FIG. 11.

It can be seen from FIG. 11 that when HCl concentration reached up to 0.20 mol/L, the stripping of the light rare-earth ions may essentially complete, the stripping acidity is low and the stripping process is easy.

EXAMPLE 138

Stripping experiment on [A336][P204] loaded with rare-earth ions by a HCl solution.

1.0 mL of a n-heptane solution of [A336][P204] loaded with La(III) ions was mixed with 5.0 mL HCl solution with a concentration of 0.03~0.20 mol/L respectively, and shaken at a constant temperature of 25° C. for 1 hour, and then the stripping rate of La(III) ions was determined when stripped with different concentrations of stripping solutions.

EXAMPLES 139~141

Figure 12:
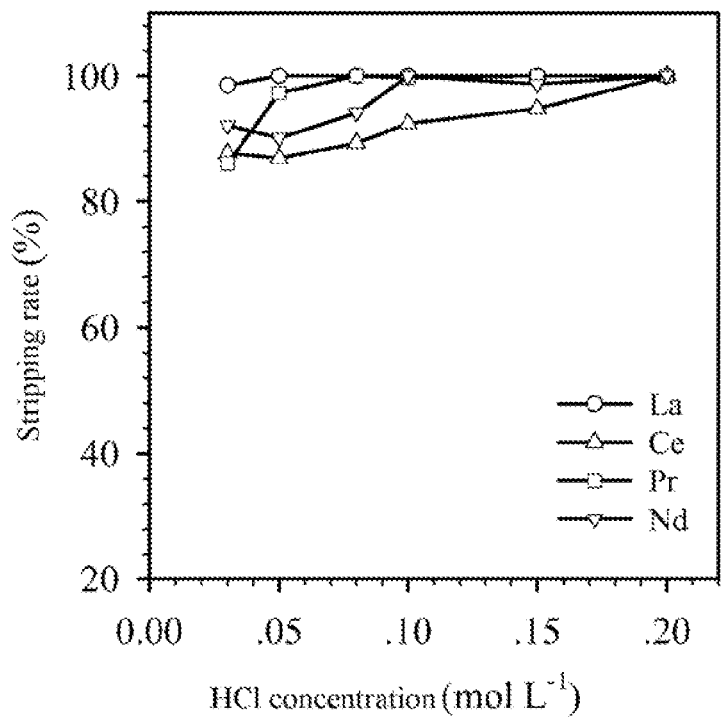
FIG. 12 is a graph of HCl solution concentrations versus the stripping rate of loaded rare-earth ions with [A336][P204] as an extractant, provided in examples 138~141 of the present invention.

The extraction rate of Ce(III), Pr(III) and Nd(III) were obtained respectively, by employing steps of example 138, and the results were shown in FIG. 12.

It can be seen from FIG. 12 that when the HCl concentration reached up to 0.20 mol/L, the stripping of the light rare-earth ions may essentially complete, the stripping acidity is low and the stripping process is easy.

EXAMPLE 142

Separation factor of the extractant [A336][P507] for mixed rare-earths.

Based on the composition of Baotou rare-earth ores, a mixed solution containing La(III), Ce(III), Pr(III) and Nd(III) was formulated. 1.0 mL of 0.05 mol/L solution of [A336][P507] in n-heptane was mixed with 5.0 mL of the mixed solution having a NaCl concentration of 1.0 mol/L and a concentration of $2.5 \times 10^{-4}$ mol/L, $4.5 \times 10^{-4}$ mol/L, $1.7 \times 10^{-4}$ mol/L and $2.1 \times 10^{-4}$ mol/L for La(III), Ce(III), Pr(III) and Nd(III) respectively, and shaken at a constant temperature of 25° C. for 1 hour. The La(III), Ce(III), Pr(III) and Nd(III) concentrations in the aqueous phase were determined, and the extraction rate, and the separation factor (β) between different rare-earth ions were calculated. Results were shown in table 7. It can be seen from table 7 that, in a mixed system, the separation factor of La(III), Ce(III), Pr(III) and Nd(III) is relative large.

TABLE 7

Separation factor between different rare-earth ions in a mixed system

| RE(III) | Ce | Pr | Nd |
|---|---|---|---|
| La | 23.49 | 26.56 | 153.87 |
| Ce | | 1.13 | 6.55 |
| Pr | | | 5.79 |

EXAMPLE 143

Extraction of mixed rare-earths with the extractant [A336][P507] in the presence of different anions.

A mixed solution of La(III), Ce(III), Pr(III), Nd(III), Y(III), Gd(III) and Yb(III) sulfate was formulated. The concentrations for La(III), Ce(III), Pr(III), Nd(III), Y(III), Gd(III) and Yb(III) in the mixed solution were $4.6 \times 10^{-4}$ mol/L, $7.1 \times 10^{-4}$ mol/L, $1.8 \times 10^{-4}$ mol/L, $2.5 \times 10^{-4}$ mol/L, $0.4 \times 10^{-4}$ mol/L, $0.1 \times 10^{-4}$ mol/L and $2.6 \times 10^{-4}$ mol/L respectively, and the total rare-earth concentration in the solution was $1.93 \times 10^{-3}$ mol/L. 1.0 mL of 0.02 mol/L solution of [A336][P507] in n-heptane was mixed with 4.0 mL of the above solution, wherein the aqueous solution had a NaCl concentration of 0.01~1.0 mol/L. It is shaken for 30 minutes at a constant temperature of 25° C., and the total rare-earth concentration in the aqueous phase after shaking at different concentrations of the salting-out agent NaCl was determined. The extraction rate was calculated. When the NaCl concentrations were different, the extraction rate would vary. Results were shown in FIG. 13.

Figure 13:
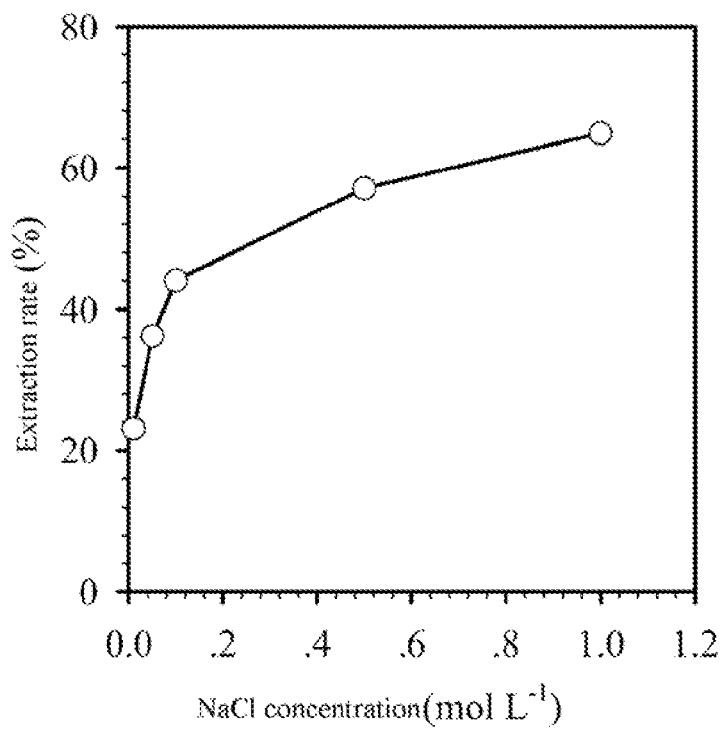
FIG. 13 is a graph showing the influence of NaCl concentrations on the extraction rate, provided in example 143 of the present invention.

It can be seen from FIG. 13 that, in the presence of various anions in the aqueous solution, the extraction rate was improved as the concentration of the salting-out agent NaCl increased, and the extraction rate of the rare-earth chloride in the mixed anions system was improved.

EXAMPLE 144

Extraction cycle experiment on La(III) with the extractant [A336][P507].

In order to investigate the reusability and stability of the extractant, 1.0 mL of 0.05 mol/L solution of [A336][P507] in n-heptane was mixed with 5.0 mL of aqueous solution containing NaCl and La(III), wherein the aqueous solution had a NaCl concentration of 1.0 mol/L, and a La(III) concentration of $7.5 \times 10^{-4}$ mol/L, and shaken at a constant temperature of 25° C. for 1 hour. The La(III) concentration in the aqueous phase was determined and the extraction rate was calculated. After that, the metallic ions on the extractant loaded with La(III) were separated with the extractant [A336][P507] by using HCl with a concentration of 0.1 mol/L as a stripping agent. This extractant was reused to continue the above experiment, to obtain the values of the extraction rate of the extractant after several cycles, as shown in table 8. From table 8, it can be seen that, the extraction rate for the extractant essentially did not change after 4 extraction cycles; therefore, this extractant has a good stability and reusability.

TABLE 8

Extraction cycle experiment of La(III) with the extractant [A336][P507]

| | 1 | 2 | 3 | 4 |
|---|---|---|---|---|
| E (%) | 87.60 | 86.29 | 86.40 | 86.12 |

EXAMPLE 145

Potassium hydroxide (8.4 g, 0.15 mol) was dissolved into 42 ml ethanol, and $[C_{25}H_{54}N][Cl]$ (40 g, 0.1 mol) was added dropwise, stirred for 1 hour at room temperature, and filtered to remove the precipitate of potassium chloride, to obtain a clear ionic liquid $[C_{25}H_{54}N][OH]$.

To the prepared $[C_{25}H_{54}N][OH]$ (0.1 mol) 2-ethylhexyl phosphonic acid mono-2-ethylhexyl ester (P507) (0.08 mol) was added, and stirred for 2 hours at room temperature. The upper organic phase of ionic liquid was taken to be washed with deionized water for 3 times, followed by vacuum distillation to recover the solvent ethanol, to obtain the product of 2-ethylhexyl phosphonic acid mono-2-ethylhexyl ester methyl trioctyl-ammonium [A336][P507].

EXAMPLE 146

Effects of the equilibrium pH values of a solution on distribution ratio of extraction of a single rare-earth ion by [A336][P507]

1.0 mL of 0.05 mol/L solution of [A336][P507] in n-heptane was mixed with 4.0 mL of aqueous solution containing $Na_2SO_4$ and La(III), wherein the aqueous solution had a $Na_2SO_4$ concentration of 1.0 mol/L, and a La(III) concentration of $7.5 \times 10^{-4}$ mol/L, and shaken at a constant temperature of 25° C. for 0.5 hour. The equilibrium pH value of the aqueous phase and the La(III) concentration in the corresponding aqueous phase were determined respectively, and the extraction distribution ratio was calculated. When the equilibrium pH values of solutions were different, the extraction distribution ratio would vary.

EXAMPLES 147~160

By employing the same extraction method as example 146, the extraction distribution ratios of Ce(III), Pr(III), Nd(III), Sm(III), Eu(III), Gd(III), Tb(III), Dy(III), Ho(III), Er(III), Tm(III), Yb(III), Lu(III) and Y(III) were obtained respectively, that is, the distribution ratios of different rare-earth ions at different pH were obtained.

Figure 14:
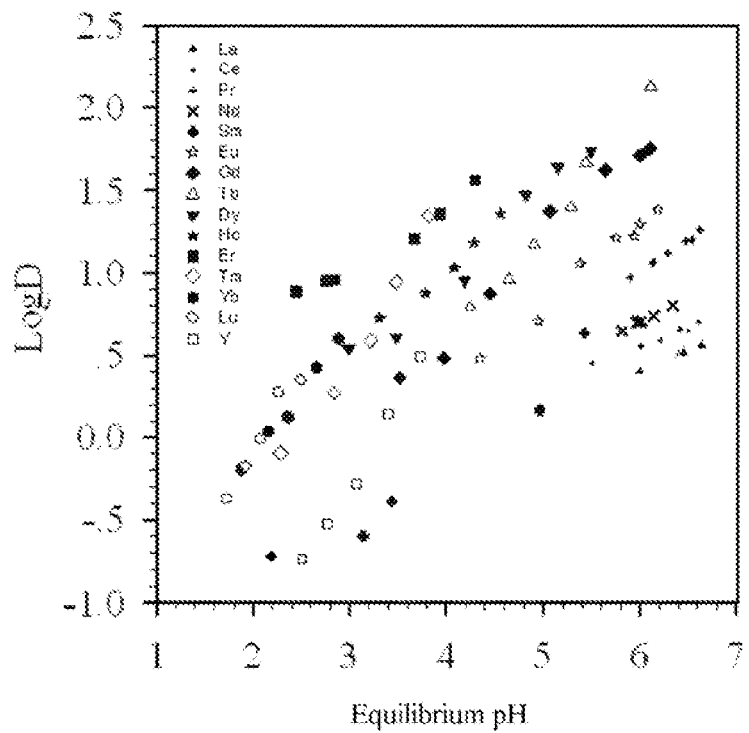
FIG. 14 is a diagram showing the relationship between the equilibrium pH values of a solution and extraction distribution ratios of rare-earth ions with [A336][P507] as an extractant, provided in examples 146~160 of the present invention.

FIG. 14 is a point diagram of equilibrium pH values of a solution versus extraction distribution ratios of rare-earth ions with [A336][P507] as an extractant. It can be seen from the figure that the distribution ratio of the rare-earth ions was increased as the equilibrium pH value increased. It can be obtained by determining the equilibrium pH value that, the equilibrium pH value ranged from 1 to 7, the extraction process of each of the different rare-earth ions may complete, and this extractant had reduced extraction acidity. The calculated average separation factor for rare-earth elements was 1.36.

EXAMPLE 161

Effect of the concentration of the salting-out agent $Na_2SO_4$ on extraction of a single rare-earth ion by [A336][P507].

1.0 mL of 0.05 mol/L solution of [A336][P507] in n-heptane was mixed with 4.0 mL of aqueous solution containing $Na_2SO_4$ and Pr(III), wherein the aqueous solution had a $Na_2SO_4$ concentration of 0.1~1 mol/L, and a Pr(III) concentration of $7.5 \times 10^{-4}$ mol/L, and shaken at a constant temperature of 25° C. for 0.5 hour. The Pr(III) concentration in the aqueous phase was determined at different concentrations of the salting-out agent respectively, and the extraction rate was calculated. When the concentrations of the salting-out agent different, the extraction rate would vary.

EXAMPLE 162~164

Figure 15:
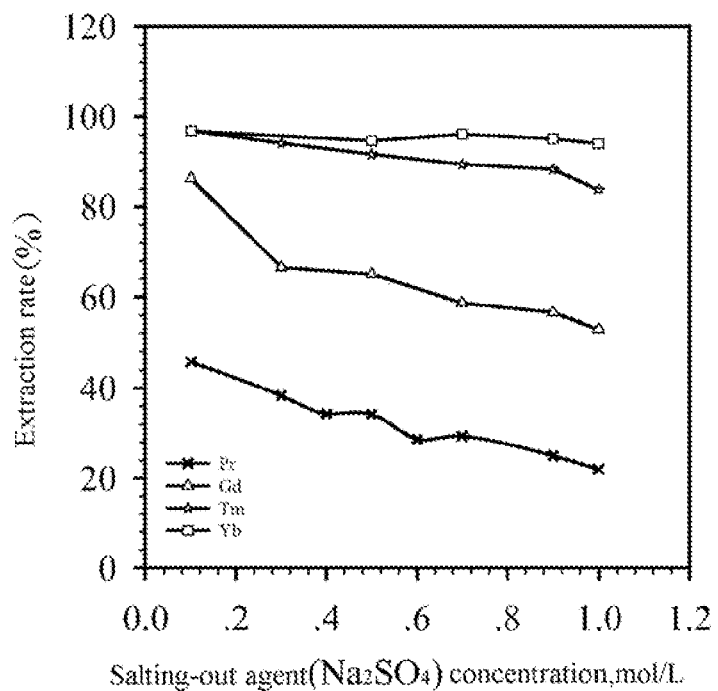
FIG. 15 is a graph of salting-out agent concentrations versus the extraction rate of rare-earth ions with [A336][P507] as an extractant, provided in examples 161~164 of the present invention.

By employing the same extraction method as example 161, extraction rate of Gd(III), Tm(III) and Yb(III) were obtained respectively, and the results were shown in FIG. 15.

It can be seen from FIG. 15 that, the extraction rate was decreased with the increasing of the concentration of the salting-out agent, therefore, the addition of the salting-out agent was adverse to extraction.

EXAMPLE 165

Effect of the concentration of the salting-out agent NaCl on extraction of a single rare-earth ion by [A336][P507].

1.0 mL of 0.02 mol/L solution of [A336][P507] in n-heptane was mixed with 4.0 mL of aqueous solution containing NaCl and mixed rare-earths RE(III), wherein the aqueous solution had a NaCl concentration of 0.01~0.1 mol/L, and a concentration of the mixed rare-earths of $1.9256 \times 10^{-3}$ mol/L, with a initial pH=3.86. It was shaken at a constant temperature of 25° C. for 0.5 hour, the concentration of the mixed rare-earths in the aqueous phase was determined at different concentrations of the salting-out agent respectively, and the extraction rate was calculated. When the concentrations of the salting-out agent were different, the extraction rate would vary.

Figure 16:
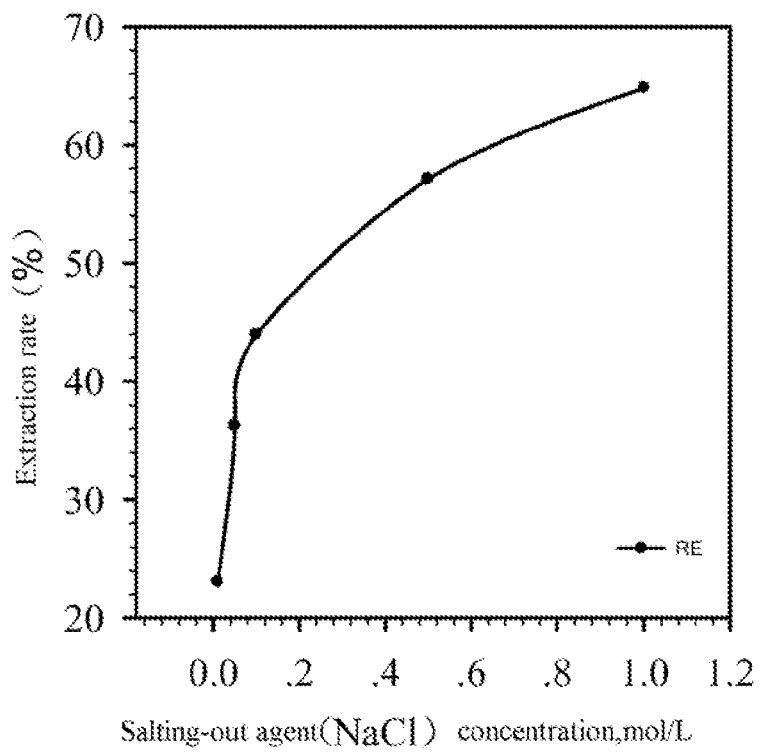
FIG. 16 is a graph of salting-out agent NaCl concentrations versus the extraction rate of rare-earth ions with [A336][P507] as an extractant, provided in example 165 of the present invention.

It can be seen from FIG. 16 that, the extraction rate was increased as the concentration of the salting-out agent increased, therefore, the addition of the salting-out agent facilitates extraction. The contents of rare-earths in the mixed rare-earth solution were shown in table 9.

TABLE 9

The rare-earth ingredients and contents thereof in the provided mixed rare-earth aqueous solution

| RE type | La | Ce | Pr | Nd | Y | Gd | Yb |
|---|---|---|---|---|---|---|---|
| Content (mmol/L) | 0.4621 | 0.7116 | 0.1848 | 0.2542 | 0.0388 | 0.0082 | 0.2634 |

EXAMPLE 166

Experiment on stripping [A336][P507] loaded with rare-earth ions by a $H_2SO_4$ solution.

The 1.0 mL n-heptane solution of [A336][P507] loaded with Pr(III) ions was mixed with 4.0 mL of $H_2SO_4$ solution with a concentration of 0.01~0.1 mol/L respectively, and shaken for 0.5 hour at a constant temperature of 25° C. The stripping rate of Pr(III) ions was determined when stripped with different concentrations of the stripping solution.

EXAMPLES 167~168

Figure 17:
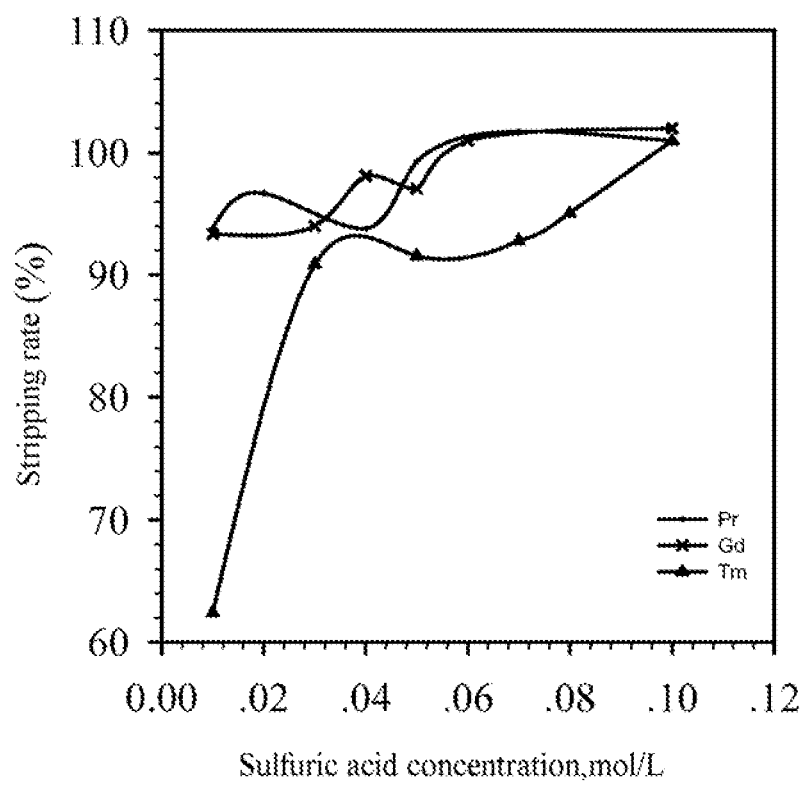
FIG. 17 is a graph of $H_2SO_4$ solution concentrations versus the stripping rate of loaded rare-earth ions with [A336][P507] as an extractant, provided in examples 166~168 of the present invention.

The stripping rate of Gd(III) and Tm(III) were obtained by employing the steps in example 166 respectively, and results were shown in FIG. 17.

From FIG. 17, it can be seen that when the $H_2SO_4$ concentration reached up to 0.10 mol/L, the stripping of the rare-earth ions may essentially complete, the stripping acidity is low and the stripping process is easy.

The above provides a detailed description regarding the method for extracting and separating a rare-earth element of the present invention. The present invention illustrates the principle and embodiments thereof by using the specific examples, and the illustration of the foregoing examples is provided only for understanding the method of the present invention and the core idea thereof. It should be noted that, for those skilled in the art, various improvements and modifications may be made to the present invention without departing from the principle of the present invention, which will all fall within the scopes of the claims of the present application.

The invention claimed is:

1. A method for extracting and separating a rare-earth element, comprising:
   extracting and separating the rare-earth element from an aqueous solution of rare-earth nitrate into n-heptane with 2-ethylhexyl phosphonic acid mono-2-ethylhexyl ester trialkyl methyl ammonium or di-2-ethylhexyl phosphoric acid trialkyl methyl ammonium as an extractant, and n-heptane as a diluent by contacting the aqueous solution of rare-earth nitrate with the extractant and the diluent to extract and separate the rare earth element into n-heptane from the aqueous solution of rare earth nitrate.

2. The method for extracting and separating a rare-earth element according to claim 1, wherein the extraction temperature is 20~50° C.; and/or wherein the aqueous solution of rare-earth nitrate has a concentration of $7~9 \times 10^{-4}$ mol/L; and/or wherein after extracting the rare-earth element from the aqueous solution of rare-earth nitrate into n-heptane, controlling the aqueous solution of rare-earth nitrate to have a pH of 1~4; and/or wherein the rare-earth element is selected from the group consisting of La, Ce, Pr, Nd, Sm, Eu, Gd, Tb, Dy, Ho, Er, Tm, Yb, Lu and Y.

3. The method for extracting and separating a rare-earth element according to claim 1, further comprising mixing a $NaNO_3$ solution with a concentration of 0.2~1.5 mol/L as a salting-out agent with the aqueous solution of rare-earth nitrate.

4. The method for extracting and separating a rare-earth element according to claim 3, wherein the extracting the rare-earth element from the aqueous solution of rare-earth nitrate into n-heptane further comprises:
   mixing a solution of a quaternary ammonium ionic liquid extractant in n-heptane, the salting-out agent and the aqueous solution of rare-earth nitrate, and extracting the rare-earth element from the aqueous solution of rare-earth nitrate into n-heptane;
   the quaternary ammonium ionic liquid extractant being the 2-ethylhexyl phosphonic acid mono-2-ethylhexyl ester trialkyl methyl ammonium or the di-2-ethylhexyl phosphoric acid trialkyl methyl ammonium.

5. The method for extracting and separating a rare-earth element according to claim 4, wherein the solution of the quaternary ammonium ionic liquid extractant in n-heptane has a concentration of 0.03~0.1 mol/L.

6. The method for extracting and separating a rare-earth element according to claim 1, further comprising:
   stripping the rare-earth elements which have been extracted into n-heptane with a nitric acid solution.

7. The method for extracting and separating a rare-earth element according to claim 6, wherein the nitric acid solution has a concentration of 0.04~0.50 mol/L.

8. A method for extracting and separating a rare-earth element, comprising:
   extracting the rare-earth element from an aqueous solution of rare-earth chloride into n-heptane, with 2-ethylhexyl phosphonic acid mono-2-ethylhexyl ester trialkyl methyl ammonium or di-2-ethylhexyl phosphoric acid trialkyl methyl ammonium as an extractant, and n-heptane as a diluent by contacting the aqueous solution of rare-earth chloride with the extractant and the diluent to extract and separate the rare-earth element into n-heptane from the aqueous solution of rare-earth chloride.

9. The method for extracting and separating a rare-earth element according to claim 8, wherein the extraction temperature is 20~50° C.; and/or wherein the aqueous solution of rare-earth chloride has a concentration of $7~11 \times 10^{-4}$ mol/L; and/or wherein after extracting the rare-earth element from the aqueous solution of rare-earth chloride into n-heptane, controlling the aqueous solution of rare-earth chloride to have a pH of 1~5; and/or wherein the rare-earth element is selected from the group consisting of La, Ce, Pr, Nd, Sm, Eu, Gd, Tb, Dy, Ho, Er, Tm, Yb, Lu and Y.

10. The method for extracting and separating a rare-earth element according to claim 8, further comprising mixing a NaCl solution with a concentration of 0.2~1.5 mol/L as a salting-out agent with the aqueous solution of rare-earth chloride.

11. The method for extracting and separating a rare-earth element according to claim 10, wherein the extracting the rare-earth element from the aqueous solution of rare-earth chloride into n-heptane further comprises:
   mixing a solution of a quaternary ammonium ionic liquid extractant in n-heptane, the salting-out agent and the aqueous solution of rare-earth chloride, and extracting the rare-earth element from the aqueous solution of rare-earth chloride into n-heptane;
   the quaternary ammonium ionic liquid extractant being the 2-ethylhexyl phosphonic acid mono-2-ethylhexyl ester trialkyl methyl ammonium or the di-2-ethylhexyl phosphoric acid trialkyl methyl ammonium.

12. The method for extracting and separating a rare-earth element according to claim 11, wherein the solution of the quaternary ammonium ionic liquid extractant in n-heptane has a concentration of 0.01~0.08 mol/L.

13. The method for extracting and separating a rare-earth element according to claim 8, further comprising:
   stripping the rare-earth elements which have been extracted into n-heptane with a hydrochloric acid solution.

14. The method for extracting and separating a rare-earth element according to claim 13, wherein the hydrochloric acid solution has a concentration of 0.03~0.20 mol/L.

15. A method for extracting and separating a rare-earth element, comprising:
   extracting the rare-earth element from an aqueous solution of rare-earth sulfate into n-heptane, with 2-ethylhexyl phosphonic acid mono-2-ethylhexyl ester trialkyl methyl ammonium as an extractant, and n-heptane as a diluent by contacting the aqueous solution of rare-earth sulfate with the extractant and the diluent to extract and separate the rare-earth element into n-heptane from the aqueous solution of rare-earth sulfate.

16. The method for extracting and separating a rare-earth element according to claim 15, wherein the extraction temperature is 25~50 °C.; and/or wherein the aqueous solution of rare-earth sulfate has a concentration of $7~9\times10^{-4}$ mol/L; and/or wherein after extracting the rare-earth element from the aqueous solution of rare-earth sulfate into n-heptane, controlling the aqueous solution of rare-earth sulfate to have a pH of 1~7; and/or wherein the rare-earth element is selected from the group consisting of La, Ce, Pr, Nd, Sm, Eu, Gd, Tb, Dy, Ho, Er, Tm, Yb, Lu and Y.

17. The method for extracting and separating a rare-earth element according to claim 15, further comprising mixing a $Na_2SO_4$ solution with a concentration of 0.1~1.0 mol/L as a salting-out agent with the aqueous solution of rare-earth sulfate.

18. The method for extracting and separating a rare-earth element according to claim 17, wherein the extracting the rare-earth element from the aqueous solution of rare-earth sulfate into n-heptane further comprises:
   mixing a solution of a quaternary ammonium ionic liquid extractant in n-heptane, the salting-out agent and the aqueous solution of rare-earth sulfate, and extracting the rare-earth element from the aqueous solution of rare-earth sulfate into n-heptane;
   the quaternary ammonium ionic liquid extractant being the 2-ethylhexyl phosphonic acid mono-2-ethylhexyl ester trialkyl methyl ammonium.

19. The method for extracting and separating a rare-earth element according to claim 18, wherein the solution of the quaternary ammonium ionic liquid extractant in n-heptane has a concentration of 0.02~0.08 mol/L.

20. The method for extracting and separating a rare-earth element according to claim 15, further comprising:
   stripping the rare-earth elements which have been extracted into n-heptane with a sulfuric acid solution.

21. The method for extracting and separating a rare-earth element according to claim 20, wherein the sulfuric acid solution has a concentration of 0.01~0.1 mol/L.

\* \* \* \* \*